US009184882B2

(12) United States Patent
Adjakple et al.

(10) Patent No.: US 9,184,882 B2
(45) Date of Patent: Nov. 10, 2015

(54) METHOD AND APPARATUS FOR SYNCHRONOUS HARQ OPERATION AND INTERFERENCE AVOIDANCE

(75) Inventors: Pascal M. Adjakple, Great Neck, NY (US); Stephen E. Terry, Northport, NY (US); Mihaela C. Beluri, Huntington, NY (US); Sung-Hyuk Shin, Northvale, NJ (US); Janet A. Stern-Berkowitz, Little Neck, NY (US); Marian Rudolf, Montreal (CA); John W. Haim, Baldwin, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 431 days.

(21) Appl. No.: 12/816,794

(22) Filed: Jun. 16, 2010

(65) Prior Publication Data

US 2010/0316096 A1 Dec. 16, 2010

Related U.S. Application Data

(60) Provisional application No. 61/187,534, filed on Jun. 16, 2009, provisional application No. 61/233,882, filed on Aug. 14, 2009.

(51) Int. Cl.

*H04W 72/04* (2009.01)
*H04L 1/18* (2006.01)
*H04L 1/00* (2006.01)

(52) U.S. Cl.

CPC ....... *H04L 1/1887* (2013.01); *H04L 2001/0097* (2013.01)

(58) Field of Classification Search

CPC ........... H04L 1/08; H04L 1/1887; H04L 1/18; H04L 1/1812; H04L 1/1816; H04L 1/1864; H04L 1/1607; H04L 2001/0097; H04W 72/00; G06F 11/07

USPC ................. 370/280, 281, 329, 277, 310, 315, 370/336–338, 230; 455/442, 509; 714/746, 714/748–751

See application file for complete search history.

(56) References Cited

U.S. PATENT DOCUMENTS

| | | | | |
|---|---|---|---|---|
| 5,428,603 | A | 6/1995 | Kivett | |
| 2005/0239467 | A1 * | 10/2005 | Nishio | 455/442 |

(Continued)

FOREIGN PATENT DOCUMENTS

| | | | |
|---|---|---|---|
| JP | 2007181094 | A2 | 7/2007 |
| WO | 2005089004 | A1 | 9/2005 |

(Continued)

OTHER PUBLICATIONS

Alcatel Shanghai Bell, Alcatel-Lucent, "Relaying for LTE-Advanced," 3GPP TSG RAN WG1, Meeting #55bis Ljubljana, Slovenia, Jan. 12-16, 2009.

(Continued)

*Primary Examiner* — Charles C Jiang
*Assistant Examiner* — Mohamed Kamara
(74) *Attorney, Agent, or Firm* — Volpe and Koenig, P.C.

(57) ABSTRACT

A method and apparatus for avoiding a collision. A collision may be avoided by allocating a first set of subframes to a backhaul link transmission, and allocating a second set of subframes to an access link transmission. In one example, the second set of subframes may be a non-overlapping set of subframes with respect to the first set of subframes. In a second embodiment, a collision may be avoided by receiving a data transmission from an evolved Node-B (eNB) and transmitting an uplink (UL) grant to a wireless transmit/receive unit (WTRU) and a first acknowledgement (ACK) to the eNB. The transmission may be in response to the received data transmission. The RN may avoid a collision by further transmitting an automatic ACK to the WTRU and transmitting a second UL grant to the WTRU. In a third embodiment, a collision between an access link transmission and a backhaul link transmission may be avoided by detecting a collision and determining an interface priority based on a collision occurrence type.

18 Claims, 18 Drawing Sheets

(56) References Cited

U.S. PATENT DOCUMENTS

| | | | | |
|---|---|---|---|---|
| 2007/0161377 | A1 | 7/2007 | Kodikara Patabandi et al. | |
| 2007/0245008 | A1* | 10/2007 | Matsui et al. | 709/223 |
| 2009/0067364 | A1* | 3/2009 | Chang et al. | 370/315 |
| 2009/0070650 | A1* | 3/2009 | Bourlas et al. | 714/748 |
| 2009/0103440 | A1 | 4/2009 | Wang et al. | |
| 2009/0225686 | A1* | 9/2009 | Haartsen | 370/277 |
| 2009/0245194 | A1* | 10/2009 | Damnjanovic et al. | 370/329 |
| 2009/0262680 | A1* | 10/2009 | Choi et al. | 370/328 |
| 2010/0034135 | A1* | 2/2010 | Kim et al. | 370/315 |
| 2011/0194407 | A1* | 8/2011 | Ji et al. | 370/226 |
| 2011/0317641 | A1* | 12/2011 | Noh et al. | 370/329 |
| 2012/0009963 | A1* | 1/2012 | Kim et al. | 455/509 |
| 2012/0033588 | A1* | 2/2012 | Chung et al. | 370/280 |

FOREIGN PATENT DOCUMENTS

| | | | |
|---|---|---|---|
| WO | 2008084949 | A1 | 7/2008 |
| WO | 2009022813 | A1 | 2/2009 |
| WO | 2009/031866 | | 3/2009 |
| WO | WO 2009/136256 | A2 * | 5/2009 |

OTHER PUBLICATIONS

Catt, et al., "DL and UL Backhaul Subframe Allocation for Type I Relay in LTE-A," 3GPP TSG RAN WG1 #57, San Francisco, U.S.A., May 4-8, 2009.
Catt, et al., "UL Backhaul Subframe for Type I Relay in LTE-A," 3GPP TSG RAN WG1 Meeting #57-bis, Los Angeles, CA, U.S.A., Jun. 29-Jul. 3, 2009.
Motorola, "Discussion of Type II (Transparent) Relays for LTE-A," 3GPP TSG RAN WG1 Meeting #57, San Francisco, U.S.A, May 4-8, 2009.
Motorola, "Frame Structure and Signaling to Support Relay Operation," 3GPP TSG RAN1 #55bis, Ljubljana, Slovenia, Jan. 12-16, 2009.
Motorola, "Frame Structure and Signaling to Support Relay Operation," 3GPP TSG RAN1 #56bis, Seoul, South Korea, Mar. 23-27, 2009.
Motorola, "Optimization of Resource Assignment for Uplink Backhaul," 3GPP TSG RAN1 #57, San Francisco, U.S.A, May 4-8, 2009.
RAN3 LTE-A Rapporteur, "LTE-A RAN3 Baseline Document," 3GPP TSG RAN WG3 Meeting #64, San Francisco, U.S.A., May 4-8, 2009.
Research in Motion, UK Limited, "DL HARQ Operation Over the Un and Uu Interfaces," 3GPP TSG RAN WG2 Meeting #66, San Francisco, U.S.A, May 4-8, 2009.
Research in Motion, UK Limited, "UL HARQ Operation Over the Un Interface," 3GPP TSG RAN WG2 Meeting #66, San Francisco U.S.A, May 4-8, 2009.
Third Generation Partnership Project, "Overview of 3GPP Release 8 V0.0.6," (Apr. 2009).
Third Generation Partnership Project, "Technical Specification Group Radio Access Network; Further Advancements for E-UTRA Physical Layer Aspects (Release9)," 3GPP TR 36.814 V0.4.1, Feb. 2009.
Third Generation Partnership Project, "Technical Specification Group Radio Access Network; Further Advancements for E-UTRA Physical Layer Aspects (Release 9)," 3GPP TR 36.814 V9.0.0, Mar. 2010.
Third Generation Partnership Project, "Technical Specification Group Radio Access Network; Requirements for Further Advancements for Evolved Universal Terrestrial Radio Access (E-UTRA) (LTE-Advanced) (Release 8)," 3GPP TR 36.913 V8.0.1, Mar. 2009.
Third Generation Partnership Project, "Technical Specification Group Radio Access Network; Requirements for Further Advancements for Evolved Universal Terrestrial Radio Access (E-UTRA) (LTE-Advanced) (Release 9)," 3GPP TR 36.913 V9.0.0, Dec. 2009.
ZTE, "Consideration on UL Access Link in LTE-A FDD System," TSG-RAN WG1 #57bis, Los Angeles, U.S.A., Jun. 29-Jul. 3, 2009.
Alcatel Shanghai Bell, Alcatel-Lucent, "Relaying for LTE-Advanced," 3GPP TSG RAN WG1, Meeting #55bis, Ljubljana, Slovenia, Jan. 12-16, 2009.
Baek et al., "Performance Analysis of Cellular-Based Two-Hop Relay Systems," IEEE Global Telecommunications Conference, pp. 4734-4738 (Dec. 2007).
Research in Motion, UK Limited, "UL HARQ Operation Over the Un Interface," 3GPP TSG RAN WG2 Meeting #66, San Francisco, U.S.A, May 4-8, 2009.
Third Generation Partnership Project, "Technical Specification Group Radio Access Network; Further Advancements for E-UTRA Physical Later Aspects (Release 9)," 3GPP TR 36.814 V0.4.1, Feb. 2009.
Third Generation Partnership Project, "Technical Specification Group Radio Access Network; Further Advancements for E-UTRA Physical Later Aspects (Release 9)," 3GPP TR 36.814 V9.0.0, Mar. 2010.
Third Generation Partnership Project, "Technical Specification Group Radio Access Network; Requuirements for Further Advancements for Evolved Universal Terrestrial Radio Access (E-UTRA) (LTE-Advanced) (Release 9)," 3GPP TR 36.913 V9.0.0, Dec. 2009.
Fujitsu, "On UL backhaul for relaying operation for LTE-A FDD," 3GPP TSG-RAN1 #56bis, R1-091584 (Mar. 23-27, 2009).
Huawei, "Consideration on FDD Type 1 Relay Frame Structure," 3GPP TSG RAN WG1 meeting #57, R1-091807 (May 4-8. 2009).
LG Electronics, Inc., "Backhaul subframe allocation for HARQ operation," TSG-RAN WG1 Meeting #57, R1-092116 (May 4-8, 2009).
Research in Motion et al., "Relay Link HARQ Operation," 3GPP TSG RAN WG1 Meeting #57, R1-091784, San Francisco, USA (May 4-8, 2009).

* cited by examiner

| 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|
| A | A | B | A | A | A | A | B | B | A | A | A | B | B | A | A | A |

| 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|
| A | R | B | R | A | A | R | B | R | A | A | R | B | R | A | A | R |

| 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|
| A | A | B | B | A | A | B | B | A | A | A | A | B | B | A | A | B | B | A | A |

METHOD AND APPARATUS FOR SYNCHRONOUS HARQ OPERATION AND INTERFERENCE AVOIDANCE

CROSS REFERENCE TO RELATED APPLICATIONS

This application claims the benefit of U.S. Provisional Application Nos. 61/187,534 filed on Jun. 16, 2009, and 61/233,882 filed on Aug. 14, 2009, which are hereby incorporated by reference.

TECHNOLOGY FIELD

This application is related to wireless communications.

BACKGROUND

In order to support higher data rate and spectrum efficiency, the Third Generation Partnership Project (3GPP) Long Term Evolution (LTE) system has been introduced. The goals of LTE are to provide high data rates, reduced latency, enhanced quality of service (QoS), low cost for operators and cost efficiency roll-out. In LTE advanced (LTE-A) systems, several technology components may be considered to provide higher data rates, reduced latency, and enhanced QoS. These technology components may include, for example, bandwidth extension, spectrum aggregation, extended multi-antenna solutions, coordinated multipoint transmission and repeater/relaying functionality.

Relaying may be considered for LTE-A as a tool to improve, for example, the coverage of high data rates, group mobility, temporary network deployment, the cell-edge throughput and/or to provide coverage in new areas. The relaying technology may be relevant in an LTE-A context given the potential frequency spectrum range of LTE-A deployment and the associated heavy path loss and the aggressive propagation conditions that may restrict the radio coverage in urban areas. However, implementing relaying technology may introduce signaling complexities that may result in collisions.

SUMMARY

A method may be implemented in a relay node (RN) for avoiding a collision. A collision may be avoided by allocating a first set of subframes to a backhaul link transmission, and allocating a second set of subframes to an access link transmission. In one example, the second set of subframes may be a non-overlapping set of subframes with respect to the first set of subframes.

In another method implemented in a RN, a collision between an access link transmission and a backhaul link transmission may be avoided by receiving a data transmission from an evolved Node-B (eNB) and transmitting an uplink (UL) grant to a wireless transmit/receive unit (WTRU) and a first acknowledgement (ACK) to the eNB. The transmission may be in response to the received data transmission. The RN may avoid a collision by further transmitting an automatic ACK to the WTRU and transmitting a second UL grant to the WTRU.

In yet another method implemented in a RN, a collision between an access link transmission and a backhaul link transmission may be avoided by detecting a collision and determining an interface priority based on a collision occurrence type.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station (MS), an advanced mobile station (AMS), a station (STA), a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, an advanced base station (ABS), a site controller, an access point (AP), a home Node-B (HnB) or any other type of interfacing device capable of operating in a wireless environment. The terminology "WTRU" and "base station" are not mutually exclusive.

Figure 1:
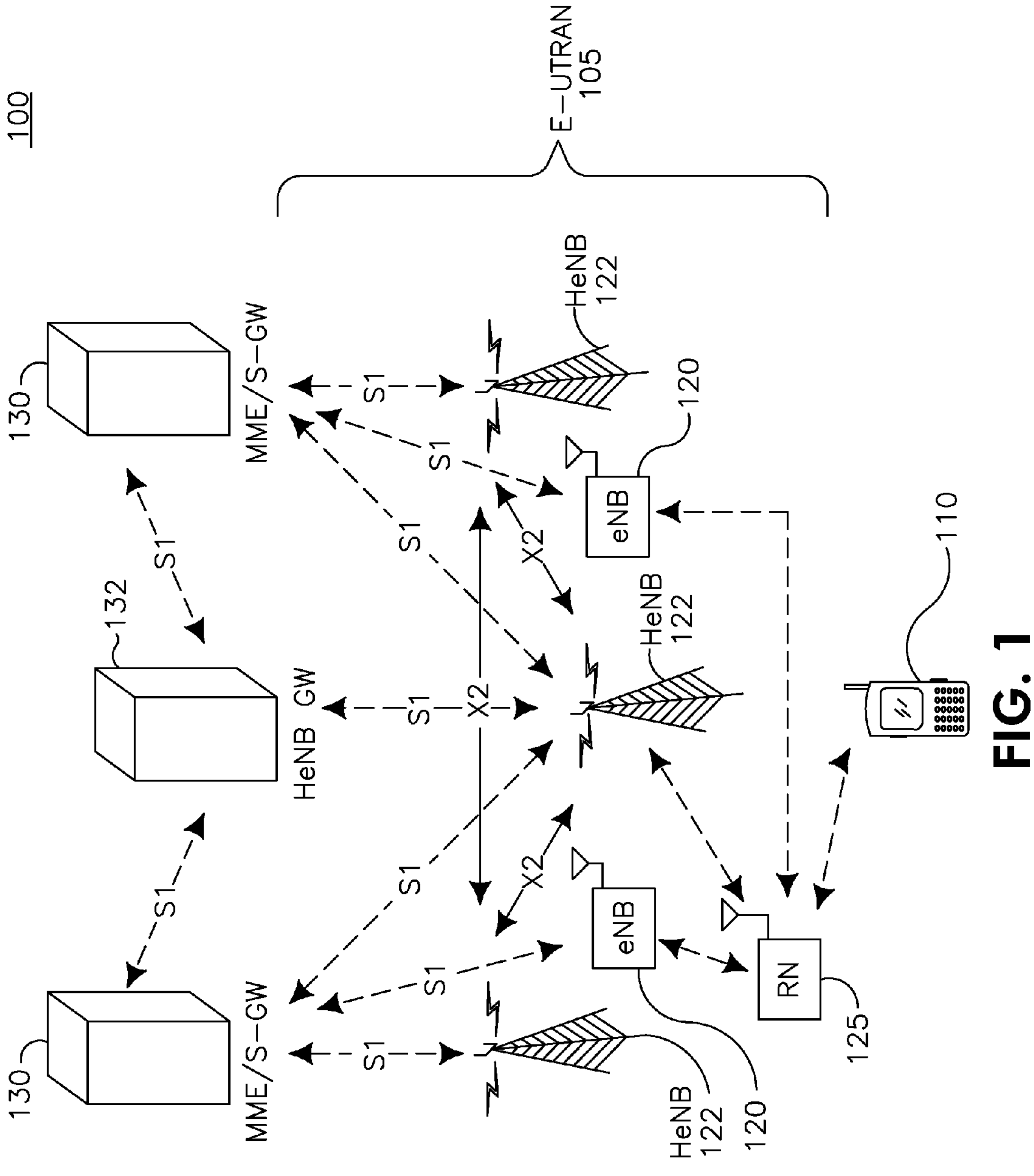
FIG. 1 is a diagram of an example Long Term Evolution (LTE) wireless communication system/access network.

FIG. 1 is a diagram of an example Long Term Evolution (LTE) wireless communication system/access network 100 that includes an Evolved-Universal Terrestrial Radio Access Network (E-UTRAN) 105. The E-UTRAN 105 may include several evolved Node-Bs (eNBs) 120, one or more Home eNBs (HeNBs) 122, a relay node (RN) 125 and a HeNB Gateway (HeNB GW) 132. The WTRU 110 may be in communication with an eNB 120, the HeNB 122, or both. The eNBs 120 may interface with each other using an X2 interface (not shown). Each of the eNBs 120 and the HeNB GW 132 may interface with a Mobility Management Entity (MME)/Serving Gateway (S-GW) 130 through an S1 interface. The HeNB 122 may interface with the HeNB GW 132 through an S1 interface, with the MME/S-GW 130 through an S1 interface, or with both. Although a single WTRU 110, multiple HeNB 122, a single RN 125, and two eNBs 120 are shown in FIG. 1, it should be apparent that any combination of wireless and wired devices may be included in the wireless communication system/access network 100.

Figure 2:
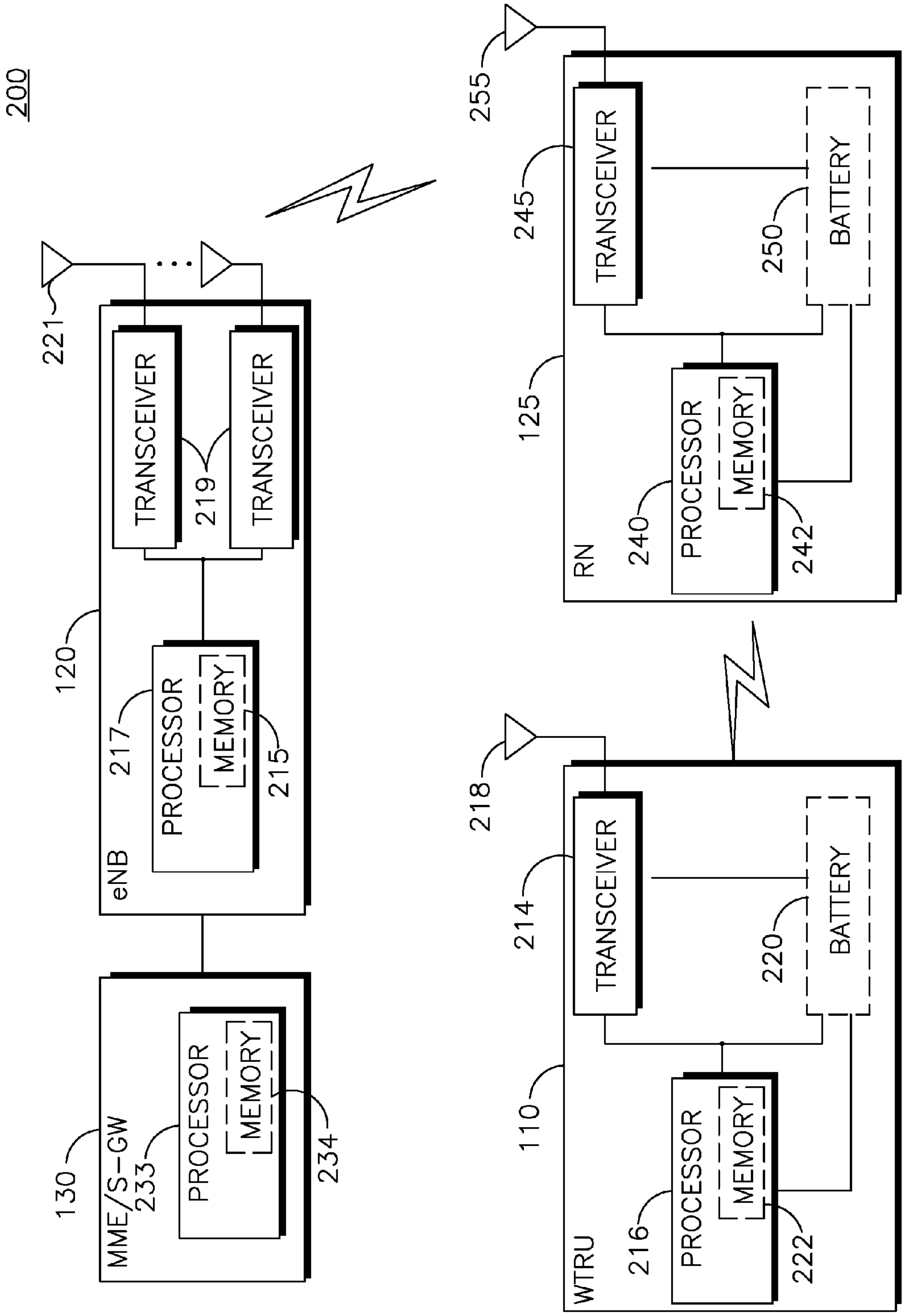
FIG. 2 a block diagram of an example of an LTE wireless communication system.

FIG. 2 is a block diagram of an example of an LTE wireless communication system 200 including the WTRU 110, the eNB 120, RN 125, and the MME/S-GW 130. Although the eNB 120 and MME/S-GW 130 are shown for simplicity, it should be apparent that an example of a HeNB 122 and HeNB GW 132 may include substantially similar features. As shown in FIG. 2, the WTRU 110, the eNB 120, the RN 125, and the MME/S-GW 130 may be configured to support synchronous hybrid automatic repeat request (HARQ) operations and interference avoidance.

In addition to the components that may be found in a typical WTRU, the WTRU 110 may include a processor 216 with an optional linked memory 222, at least one transceiver 214, an optional battery 220, and an antenna 218. The processor 216 may be configured to perform HARQ operations and interference avoidance. The transceiver 214 may be in communication with the processor 216 and the antenna 218 to facilitate the transmission and reception of wireless communications. An optional battery 220 may be used in the WTRU 110 to power the transceiver 214 and the processor 216.

The WTRU 110 may be adapted to avoid UL access backhaul collisions. The processor 216 may be configured to process a pattern of three access subframes, followed by two backhaul subframes. The transceiver 214 may be configured to receive the subframes periodically. The WTRU 110 may be further configured to transmit and/or receive ACK and NACK messages based on a modified UL grant timing to ensure that there are no collisions between access and backhaul links.

In addition to the components that may be found in a typical eNB, the eNB 120 may include a processor 217 with an optional linked memory 215, transceivers 219, and antennas 221. The processor 217 may be configured to perform bandwidth management. The transceivers 219 may be in communication with the processor 217 and antennas 221 to facilitate the transmission and reception of wireless communications. The eNB 120 may be connected to the Mobility Management Entity/Serving Gateway (MME/S-GW) 130 which may include a processor 233 with an optional linked memory 234.

The eNB 120 may work in conjunction with the RN 125 to resolve UL access backhaul collisions at the RN 125. The processor 217 may be configured to generate a pattern of three access subframes, followed by two backhaul subframes. The transceivers 219 may be configured to transmit the subframes periodically. The eNB 120 may be further configured to modify the timing of ACK and NACK messages, and modify UL grant timing to ensure that there are no collisions between access and backhaul links.

In addition to the components that may be found in a typical RN, the RN 125 may include a processor 240 with an optional linked memory 242, at least one transceiver 245, an optional battery 250, and an antenna 255. The processor 240 may be configured to perform HARQ operations and interference avoidance. The transceiver 245 may be in communication with the processor 240 and the antenna 255 to facilitate the transmission and reception of wireless communications. An optional battery 250 may be used in the RN 125 to power the transceiver 245 and the processor 240.

The RN 125 may resolve UL access backhaul collisions. The processor 240 may be configured to generate a pattern of three access subframes, followed by two backhaul subframes. The transceiver 245 may be configured to transmit the subframes periodically. The RN 125 may be further configured to modify the timing of ACK and NACK messages, and modify UL grant timing to ensure that there are no collisions between access and backhaul links.

Figure 3:
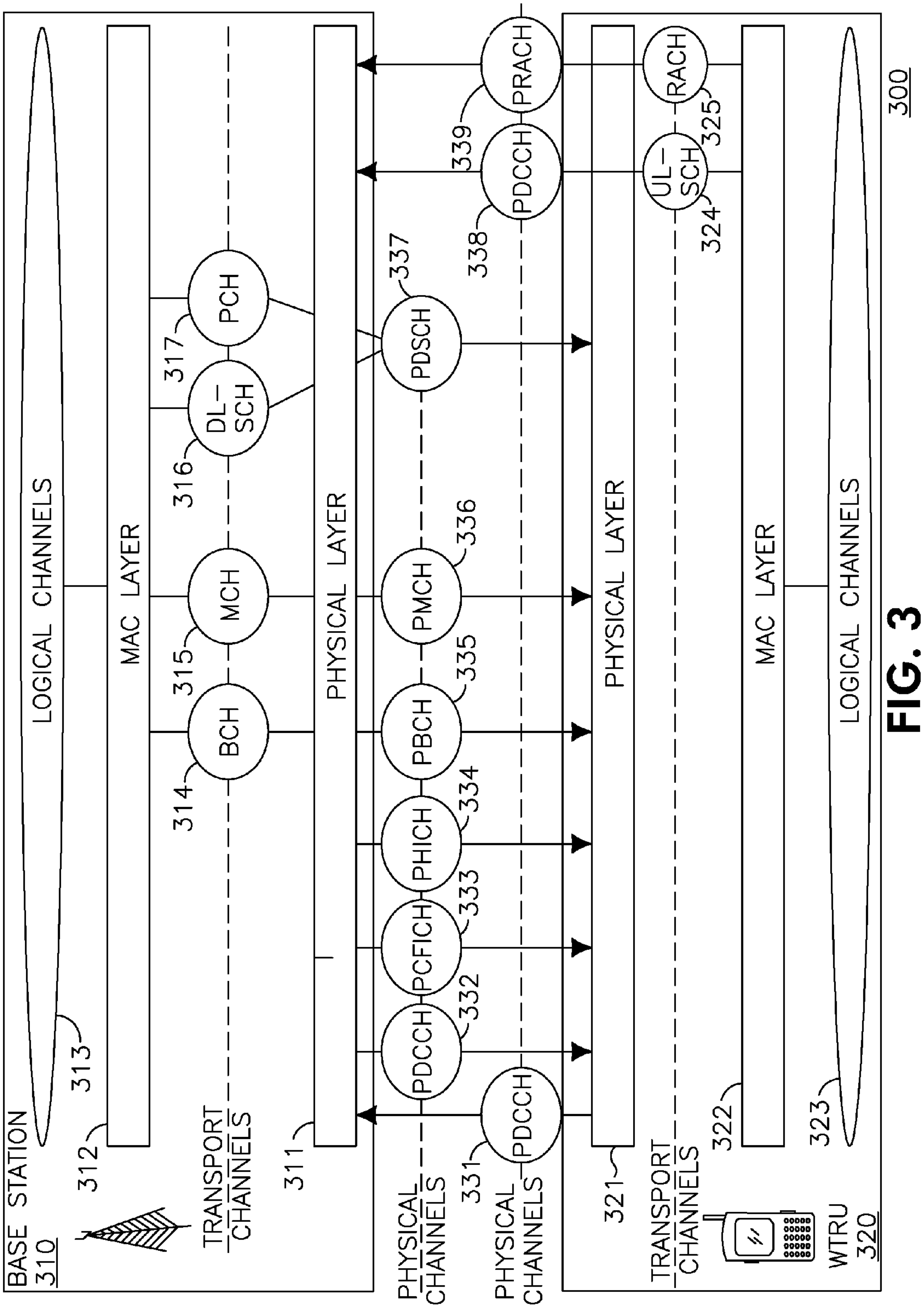
FIG. 3 is a diagram of the channels that may be used in an example LTE system.

FIG. 3 is a diagram of the channels that may be used in an example LTE system 300. Referring to FIG. 3, the base station 310 may include a physical layer 311, a medium access control (MAC) layer 312, and logical channels 313. The physical layer 311 and the MAC layer 312 of the base station 310 may communicate via transport channels that may include, but are not limited to, Broadcast Channel (BCH) 314, Multicast Channel (MCH) 315, Downlink Shared Channel (DL-SCH) 316, and Paging Channel (PCH) 317. The WTRU 320 may include a physical layer 321, a medium access control (MAC) layer 322, and logical channels 323. The physical layer 321 and the MAC layer 322 of the WTRU 320 may communicate via transport channels that may include, but are not limited to, Uplink Shared Channel (UL-SCH) 324 and Random Access Channel (RACH) 325. The physical layers of the base station 310 and WTRU 320 may communicate via physical channels including, but not limited to Physical Uplink Control Channel (PUCCH) 331, Physical Downlink Control Channel (PDCCH) 332, Physical Control Format Indicator Channel (PCFICH) 333, Physical Hybrid Automatic Repeat Request Channel (PHICH) 334, Physical Broadcast Channel (PBCH) 335, Physical Multicast Channel (PMCH) 336, Physical Downlink Shared Channel (PDSCH) 337, Physical Uplink Shared Channel (PUSCH) 338, and/or Physical Random Access Channel (PRACH) 339.

The LTE networks shown in FIGS. 1 through 3 are just one example of a particular communication network and other types of communication networks may be used. The various embodiments may be implemented in any wireless communication technology. Some example types of wireless communication technologies include, but are not limited to, Worldwide Interoperability for Microwave Access (WiMAX), 802.xx, Global System for Mobile communications (GSM), Code Division Multiple Access (CDMA2000), Universal Mobile Telecommunications System (UMTS), Long Term Evolution (LTE), Advanced LTE (LTE-A), or any future technology. For purposes of explanation, the various embodiments are described in an Advanced Long Term Evolution (LTE-A) context, but the various embodiments may be implemented in any wireless communication technology.

When referred to hereafter, the terminology "Macro Cell" may include but is not limited to a base station, an evolved Node-B (eNB), or any other type of interfacing device capable of operating in a wireless environment. When referred to hereafter, the terminology "Home Node-B (HNB)" may include but is not limited to a base station, a Home evolved Node-B (HeNB), a femtocell, or any other type of interfacing device capable of operating in a Closed Subscriber Group wireless environment. When referred to hereafter, the terminology "Uu" may refer to the link between the RN and the WTRU, and the terminology "Un" may refer to the link between the RN and the eNB.

Relaying may be considered for LTE-A as a tool to improve, for example, the coverage of high data rates, group mobility, temporary network deployment, cell-edge throughput and/or to provide coverage in new areas. The potential frequency spectrum range of LTE-A deployment and the associated heavy path loss may lead to aggressive propagation conditions that restrict the radio coverage especially in urban areas.

Figure 4:
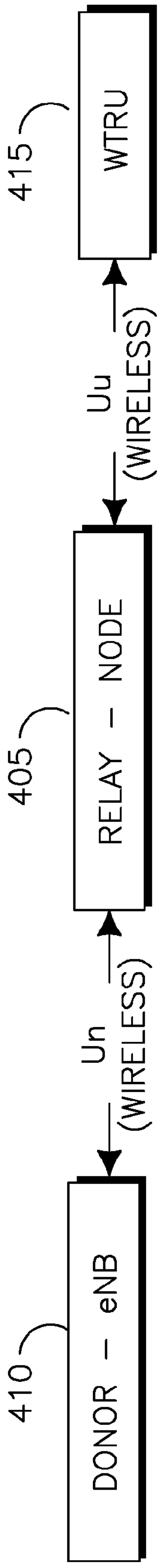
FIG. 4 is a diagram of an example network level architecture for a relay deployment.

One example of a network level architecture for a relay deployment is depicted in FIG. 4, in which a RN 405 may be wirelessly connected to a radio-access network via a donor cell 410. The connection may be inband, for example, such that the network-to-RN link may share the same band with direct network-to-wireless transmit/receive unit (WTRU) links within the donor cell 410. In an outband example, the network-to-RN link may not operate in the same band as direct network-to-WTRU links within the donor cell.

The RN may be a transparent RN, for example, such that the WTRU 415 is not aware of whether or not it communicates with the network via the RN 405, or a non-transparent RN in which case the WTRU 415 is aware of whether or not it is communicating with the network via the RN 405. The RN 405 may be part of a donor cell or control cells of its own.

If the RN 405 is part of the donor cell 410, the RN 405 may not have a cell identity (ID) of its own, but may have a relay ID. In the case the RN 405 is in control of cells of its own, the RN 405 may control one or several cells and a unique physical-layer cell identity may be provided in each of the cells controlled by the RN 405. Self-backhauling (L3 RN) and "type 1" RNs may use this type of relaying.

A type 1 RN may be an inband relaying node that control cells, each of which may appear to a WTRU as a separate cell distinct from the donor cell. The cells may have their own physical cell ID and the RN may transmit synchronization channels, reference symbols, and the like. In the context of single-cell operation, the WTRU may receive scheduling information and HARQ feedback directly from the RN and send its control channels to the RN. The control channels may include, but are not limited to a scheduling request (SR), a channel status report, and an acknowledgement (ACK). The RN may be backwards compatible. To LTE-A WTRUs, it may be possible for a type 1 RN to appear differently than an eNodeB (eNB) to allow for further performance enhancement.

For inband relaying, the eNB-to-RN link may operate in the same frequency spectrum as the RN-to-WTRU link. An eNB that is attached to a RN may be referred to as a donor eNB (DeNB). The RN transmitter may cause interference to its own receiver. Simultaneous eNB-to-RN and RN-to-WTRU transmissions on the same frequency resource may not be feasible without sufficient isolation of the outgoing and incoming signals. Similarly, it may not be possible to receive WTRU transmissions simultaneously at the RN when the RN may be transmitting to the eNB.

One possibility for handling the interference problem may be to operate the RN such that the RN is not transmitting to terminals when it is scheduled to receive data from the donor eNB by creating gaps in the RN-to-WTRU transmission. These gaps, during which terminals may not be scheduled to receive an RN transmission, may be created by configuring multimedia broadcast multicast services (MBMS) single frequency network (MBSFN) subframes. RN-to-eNB transmissions may be facilitated by not allowing any terminal-to-RN transmissions in some subframes.

Relaying technology may be one of the technology components to help overcome design challenges with respect to cell edge throughput and coverage extension. The deployment of relay technology, however, may present many challenges. One of those challenges may be to ensure efficiency on backhaul link bandwidth usage while maintaining proper HARQ operation issues despite constraints generated by the gap in MBSFN subframe configuration and the related self-interference issues.

Downlink (DL) backhaul collisions may be avoided by creating gaps in the RN to WTRU transmission. These gaps may be achieved by using MBSFN subframes in the DL access link. However, there is no similar mechanism for the uplink (UL). For example, to perform UL backhaul, gaps may be created in the UL access link. In this example, WTRU to RN transmissions may not be performed. The lack of a framework for gaps in the UL access link may lead to collisions between the UL access link (WTRU to RN transmission) and the UL backhaul link (RN to eNB transmission). Since a type 1 RN may not be required to simultaneously receive and transmit on the same frequency, these collisions may result in the RN missing the reception from the WTRU.

Several collision scenarios may occur. Some of these scenarios are listed in Table 1, together with a description of when they may occur. With the exception of scenarios 7 and 9, the common configuration for all the scenarios is that subframe number n may be used for DL backhaul. Subframe number n may be a regular subframe on the Un interface, and it may be signaled by the RN as a MBSFN reserved subframe on the Uu. Subframe number n may carry the communication of resource grant (DL or UL) to the RN by the eNB or the communication of the resource grant to the WTRU by the RN. The collision that may occur in subframe number n+4 may depend on the type of transmission on both the backhaul and the access link in subframe number n, as shown in Table 1. The scenarios shown in Table 1 assume that both the donor eNB and the RN may not collaborate on schedule decisions ahead of subframe number n. For example, the eNB may not communicate its resource scheduling information to the RN ahead of time, and similarly, the RN may not communicate its resource scheduling information to the eNB ahead of time.

TABLE 1

| Scenario number | Subframe number n + 4 UL backhaul link (RN to transmit) | Subframe number n + 4 UL Access link (RN to receive) | Occurrence |
|---|---|---|---|
| 1 | A/N to eNB | PUSCH data from WTRU | RN may send UL grant to WTRU with physical downlink control channel (PDCCH) in MBSFN subframe number n, and eNB may send relay physical downlink shared channel (R-PDSCH) data to the RN in subframe number n leading to a collision in subframe number n + 4 |
| 2 | Data (R-PUSCH) | Data (PUSCH) | eNB may provide UL grant to RN using R-PDCCH in subframe number n Simultaneously, RN may provide UL grant to WTRU using PDCCH in subframe number n leading to a collision in subframe number n + 4. Moreover, on a condition that n = 3 or n = 8, (n + 8) mod 10 may be 1 or 6, respectively. These subframes may be configured as MBSFN on Un, thus the collision between DL access PHICH and DL backhaul R-PHICH in sub-frame n + 8 may be avoided. If however n = 1, 2, 6 or 7, then (n + 8) mod 10 is 9, 0, 4, 5 respectively. These sub-frames may not be configured for backhaul, thus the backhaul R-PHICH in sub-frame n + 8 may not be transmitted. |
| 3 | R-PUSCH data to eNB | Repeated ACK/NACK from WTRU | eNB may provide UL grant to RN using R-PDCCH in subframe number n RN may configure the WTRU for ACK/NACK repetition RN may send DL data (PDSCH) to WTRU in sub-frame n − 1, and WTRU may transmit the UL ACK/NACK (with repetition) in sub-frames n + 3, n + 4, n + 5 and n + 6. Thus the collision may occur in sub-frame n + 4 |
| 4 | Data (R-PUSCH) | Data (PUSCH) | Similar to 4 with the difference that the Uu PUSCH transmission may be a retransmission due to prior transmission failure. |
| 5 | CSR from RN to eNB | Data (PUSCH) from the WTRU to RN | RN may schedule a WTRU for data transmission in subframe number n + 4 with UL grant provided in PDCCH in subframe number n eNB may schedule the RN for a Channel Status Report (CSR) in subframe number n + 4 WTRU UL data transmission may collide with pre-scheduled channel status reports from RN to eNB |
| 6 | Data (R-PUSCH) from RN to eNB | CSR from the WTRU to RN | eNB may schedule a RN for data transmission in subframe number n + 4 with UL grant provided in R-PDCCH in subframe number n RN may schedule the WTRU for a Channel Status Report (CSR) in subframe number n + 4 |
| 7 | CSR | ACK/NACK | eNB may schedule the RN for Channel Status Report (CSR) in subframe number n + 4 RN may transmit DL data to the WTRU in subframe number n and may be expecting an UL ACK/NACK in subframe number n + 4. |

TABLE 1-continued

| Scenario number | Subframe number n + 4 UL backhaul link (RN to transmit) | Subframe number n + 4 UL Access link (RN to receive) | Occurrence |
|---|---|---|---|
| 8 | ACK/NACK from RN to eNB | CSR | eNB may send DL data (R-PDSCH) to the RN in subframe number n. RN may send ACK or NACK in subframe number n + 4. RN may also schedule the WTRU for a CSR in subframe number n + 4. |
| 9 | CSR from RN to eNB | ACK/NACK and CSR from WTRU to RN | Subframe number n may not be a DL backhaul subframe. The RN may send PDSCH data to the R-WTRU on DL access link in subframe number n. The R-WTRU may transmit A/N feedback (and possibly CSR on a condition that so configured) to the RN in subframe number n + 4 on UL access. The eNB may configure the RN for CSR reporting on UL backhaul in subframe number n + 4. |
| 10 | A/N to eNB | PUSCH data from WTRU | Scenario very similar to 1 but the ACK/NACK transmission may be a repeated ACK/NACK |
| 11 | A/N to eNB | PUSCH data from WTRU | Scenario is similar to 1 with the difference that the PUSCH data may be a retransmission |

It should be noted that the collisions may carry different costs. For example, the loss of the UL data transmission on the access link may result in wasted resources. In this example, the WTRU may re-transmit the PUSCH that may lead to inefficient use of battery power. However, the loss of a CSR report from the WTRU may result in a non-catastrophic, soft degradation of performance. The CSR may include a channel quality indicator (CQI), a precoder matrix indicator (PMI), and/or a rank indicator (RI). Moreover, these example scenarios may not lead to a retransmission from the WTRU to the RN. Thus, there may be less resource waste and less impact on battery life.

Figure 5A:
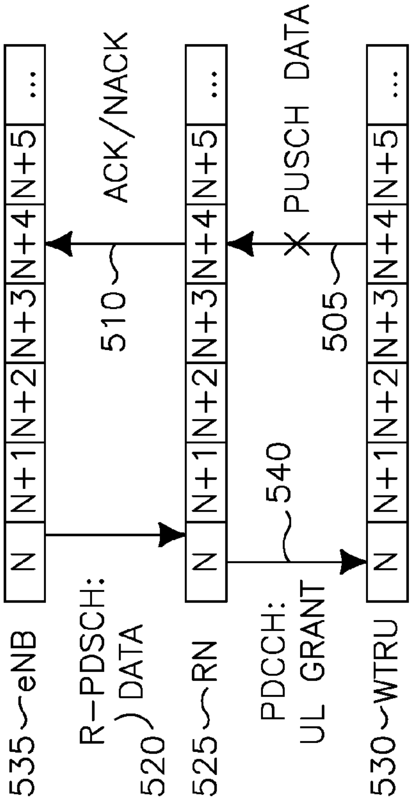
FIG. 5A is a diagram of an example scenario where uplink (UL) access data may collide with UL backhaul acknowledgement/negative-acknowledgement (ACK/NACK) feedback.
Figure 5B:
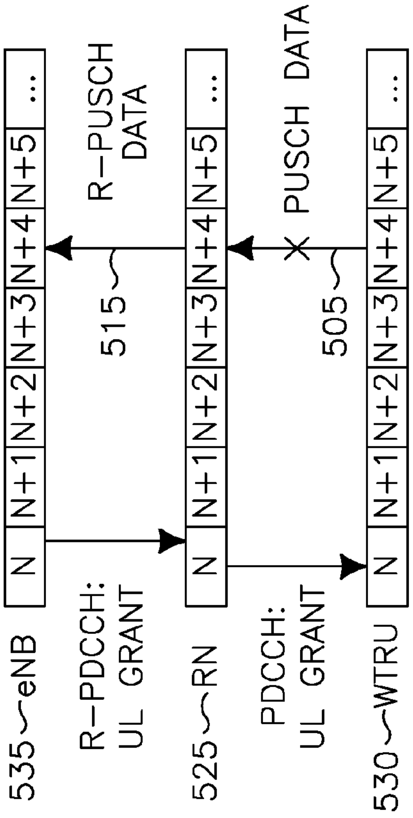
FIG. 5B is a diagram of an example scenario where UL access link data may collide with UL backhaul data.

In scenarios 1 and 2, the UL access link data on a physical UL shared channel (PUSCH) 505 may collide with UL backhaul ACK/NACK feedback 510 or UL backhaul data on a relay PUSCH (R-PUSCH) 515, as shown in FIGS. 5A and 5B, respectively. Referring to FIG. 5A, a first collision scenario may occur when an access link PUSCH 505 collides with a backhaul link ACK/NACK transmission 510 generated by a relay physical downlink shared channel (R-PDSCH) assignment 520. The RN may transmit an UL grant on the physical downlink control channel (PDCCH) that may be valid for the access link to the WTRU 530 in subframe number n, without knowing that the eNB 535 may have simultaneously scheduled a DL data transmission on the R-PDSCH within the same subframe number n for the backhaul link.

This scenario may occur because, with the PDCCH to PDSCH timing, the R-PDCCH may be sent later. For example, in FIG. 5A, the R-PDCCH may be sent in the third orthogonal frequency division multiplex (OFDM) symbol rather than the access link Control Region in subframe number n (OFDM symbols #1 and #2). When the eNB 535 assigns backhaul resources to the RN 525 through the R-PDCCH for this same subframe, the RN 525 may have previously transmitted a UL grant 540 to its WTRUs through the PDCCH. The RN 525 may be requested to transmit an UL ACK/NACK 510 corresponding to the R-PDSCH transmission 520 on the backhaul in UL subframe number n+4, while the WTRU 530 may transmit its assigned PUSCH 505 on the access link in the same subframe.

Figure 5C:
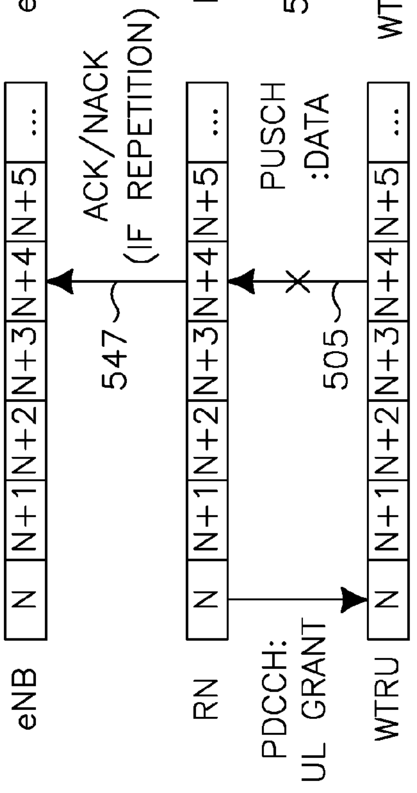
FIGS. 5C and 5D are diagrams of example variations of the scenario shown in FIG. 5A.
Figure 5D:
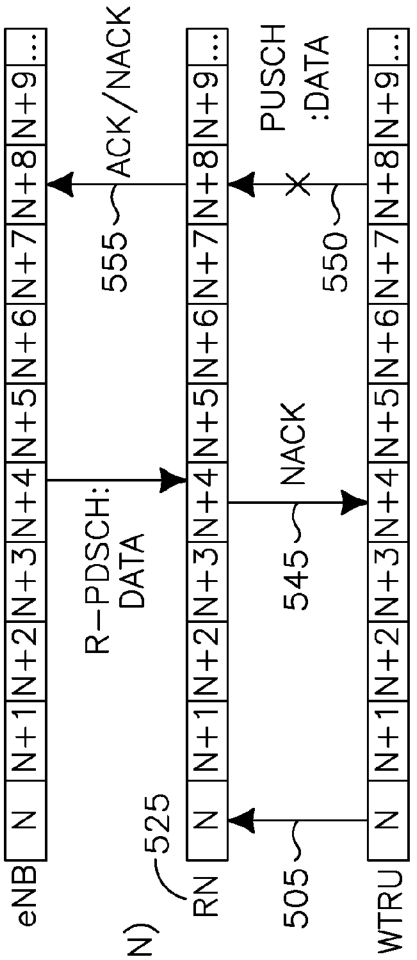

The examples shown in FIGS. 5C and 5D are variations of the scenario in FIG. 5A. Referring to FIG. 5C, a collision may occur in subframe n+4 if the ACK/NACK transmission is a repeated ACK/NACK 547. In this scenario, the collision may occur between the PUSCH data 505 and the repeated ACK/NACK 547. Referring to FIG. 5D, the RN 525 may receive PUSCH data 505 at subframe n and transmit a NACK 545 at subframe n+4. In this example scenario, the retransmitted PUSCH data 550 on the access link may collide with the ACK/NACK 555 on the backhaul link at subframe n+8.

Figure 6A:
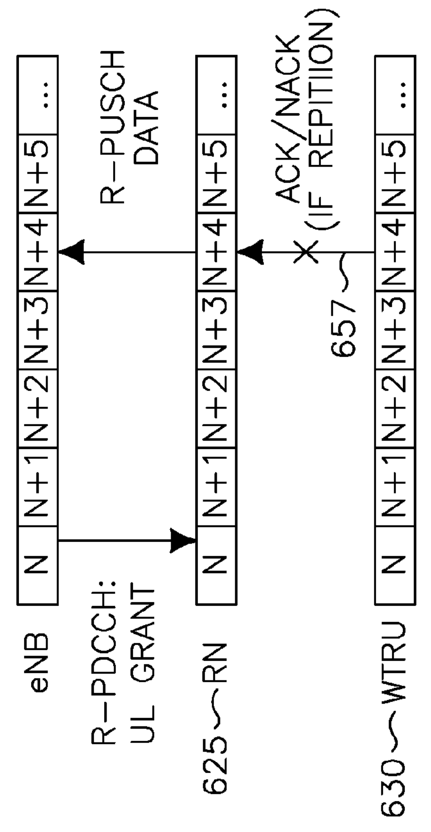
FIGS. 6A and 6B are diagrams of example variations of the scenarios shown in FIGS. 5C and 5D, respectively.
Figure 6B:
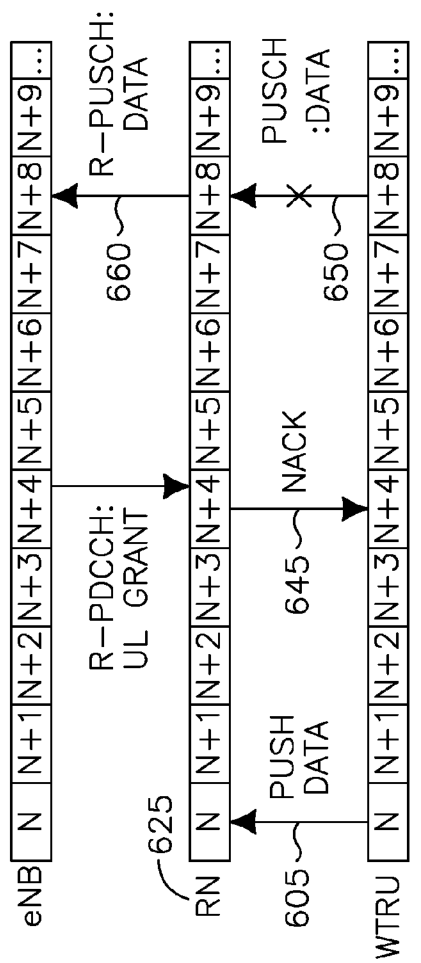

The examples shown in FIGS. 6A and 6B are variations of the scenarios in FIGS. 5C and 5D, respectively. Referring to FIG. 6A, a collision may occur in subframe n+4 if the ACK/NACK transmission is a repeated ACK/NACK 657. In this scenario, the collision may occur between the repeated ACK/NACK 657 from the WTRU 630 and the R-PUSCH data from the RN 625. Referring to FIG. 6B, the RN 625 may receive PUSCH data 605 at subframe n and transmit a NACK 645 at subframe n+4. In this example scenario, the retransmitted PUSCH data 650 may collide with the R-PUSCH data 660 at subframe n+8.

Figure 7:
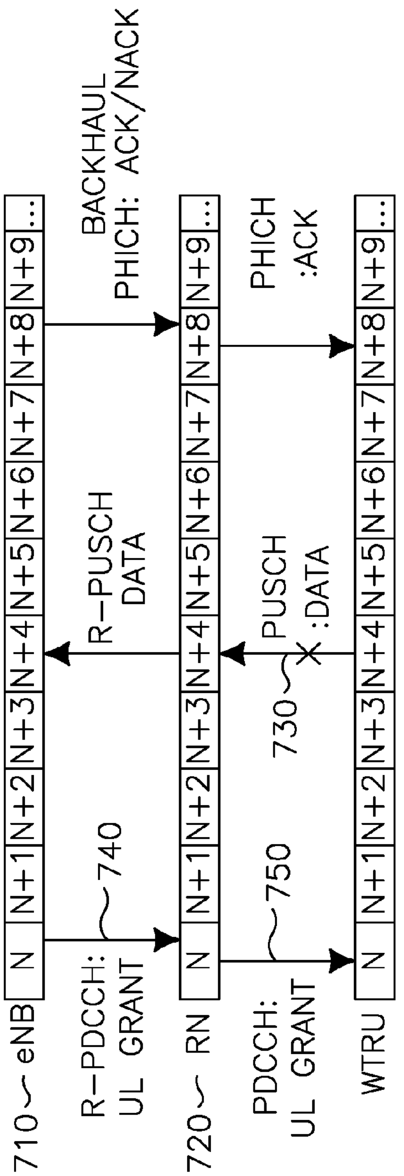
FIG. 7 is a diagram of an example scenario where UL access link data may collide with UL backhaul data and lead to a subsequent collision.

FIG. 7 is a diagram of an example scenario where UL access link data may collide with UL backhaul data and lead to a subsequent situation where the eNB 710 may not be able to transmit a PHICH to the RN 720 on the backhaul link. Referring to FIG. 7, the collision 730 on UL in sub-frame #n+4 may occur for any selection of the DL MBSFN backhaul sub-frame (i.e. for any n=1, 2, 3, 6, 7, 8 for FDD). For the example scenarios where the initial UL grant assignments in both backhaul link 740 and access link 750 are performed in subframe n=3 or 8, the ACK/NACK on PHICH may be transmitted on subframe (n+8)mod 10, for example subframe 1 or 6, which may both be MBSFN subframes. A collision may not occur, since the backhaul control region and the access link control region may be non-overlapping regions in the time domain. If, however, the initial subframe n=1, 2, 6 or 7 then the ACK/NACK on backhaul PHICH according to existing rel8/9 specification may be transmitted on subframe (n+8) mod 10, for example subframe 0,4,5 or 9, which may not be MBSFN subframes. Several alternative solutions can be considered in this case. In a first example, an always ACK solution may be implemented such that the RN 720 assumes that the eNB 710 has transmitted an ACK. The eNB 710 may then enable an adaptive retransmission by providing an UL grant to the RN 720 in subframe n+12. In a second example, the A/N (ACK or NACK) feedback may be transmitted in the next available MBSFN subframe.

As illustrated in FIG. 7, this scenario may lead to a collision in subframe number n+8 on a condition that subframe number n+8 cannot be configured for DL backhaul. On a condition that the original subframe number n=3 or n=8, then (n+8) mod 10=1 or 6 respectively, which means that a DL backhaul may be configured using an MBSFN subframe in the relay cell. Thus, the DL collision in subframe number n+8 may be avoided. However, on a condition that the original subframe number n was either 1, 2, 6, or 7, subframe (n+8) mod 10 may not be configured for DL backhaul. This may lead to a potential DL collision between the backhaul and access links where the backhaul PHICH ACK/NACK 670 may collide with the PHICH ACK 580.

Figure 8A:
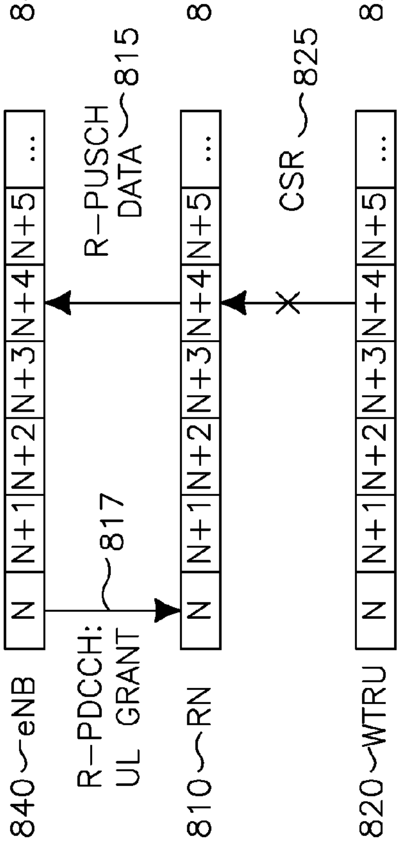
FIG. 8A is a diagram of an example scenario where UL access channel sounding response (CSR) feedback may collide with UL backhaul data.
Figure 8B:
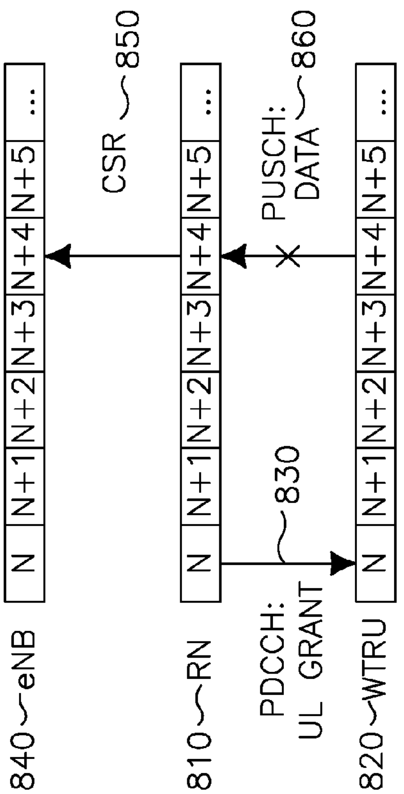
FIG. 8B is a diagram of an example scenario where UL access CSR feedback may collide with UL access link data.

FIGS. 8A and 8B are diagrams of example collision scenarios where UL access CSR feedback may collide with UL backhaul data (R-PUSCH) or UL access link data (PUSCH) may collide with UL backhaul CSR. These collisions may occur for any n=1, 2, 3, 6, 7, 8 in FDD. Referring to FIG. 8A, the eNB 840 may schedule a RN 810 for data transmission 815 in subframe n+4 with a UL grant 817 provided in R-PDCCH in subframe n. The RN 810 may have scheduled the WTRU 820 for a CSR 825, thereby potentially causing a collision between the CSR 825 and the scheduled data transmission 815 in subframe n+4. Referring to FIG. 8B, the RN 810 may schedule a WTRU 820 for data transmission in subframe n+4 with a UL grant 830 provided in PDCCH in subframe n. The eNB 840 may schedule the RN 810 for a CSR 850 in subframe n+4. The UL data transmission 860 from the WTRU 810 may collide with the CSR 850.

Figure 9A:
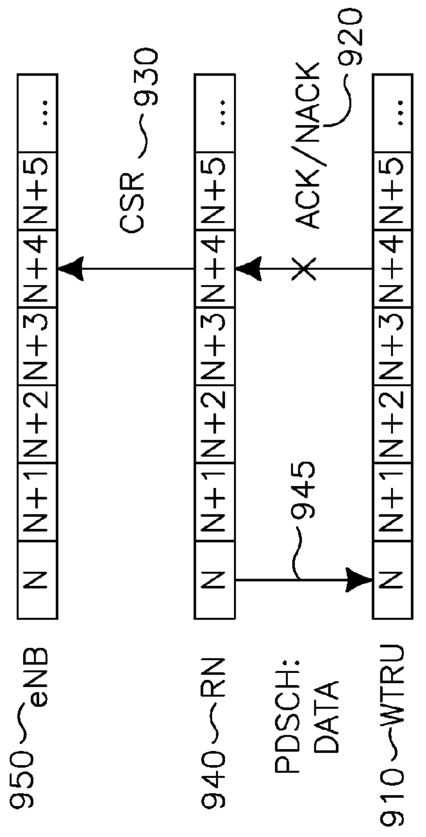
FIG. 9A is a diagram of an example scenario where UL access ACK/NACK may collide with UL backhaul CSR.
Figure 9B:
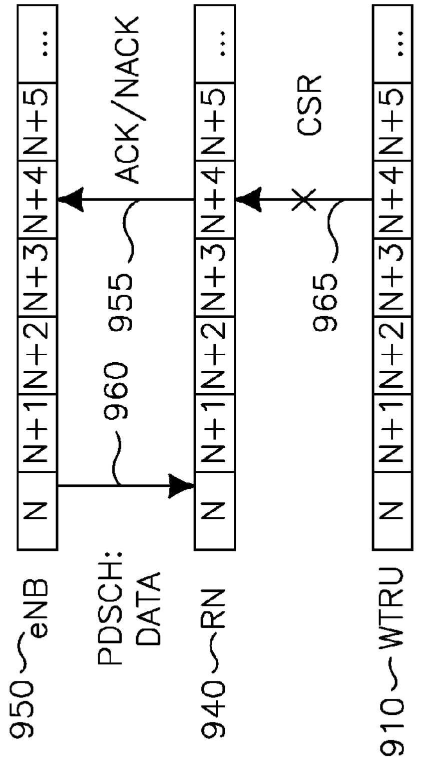
FIG. 9B is a diagram of an example scenario where UL access CSR may collide with UL backhaul ACK/NACK.

FIGS. 9A and 9B are diagrams of example collision scenarios where UL access ACK/NACK may collide with UL backhaul CSR or UL access CSR may collide with UL backhaul ACK/NACK. These collisions may occur for any of the DL MBSFN backhaul subframes (n=1, 2, 3, 6, 7, 8 for FDD). The scenario illustrated in FIG. 9A may have two variants. In a first example, the WTRU 910 may be configured for ACK/NACK repetition on the UL access link, and as a result, may transmit an UL ACK/NACK 920 in subframe n+3, n+4, n+5 and n+6 (shown in n+4 for simplicity) to the DL access PDSCH transmission in subframe number n−1. The UL collision with the CSR 930 in subframe n+4 may not be costly, since there may be potentially three more opportunities for the RN 940 to correctly receive the ACK/NACK from the WTRU 910. In a second example, subframe number n may be a regular DL access subframe. The RN 940 may transmit PDSCH data 945 to the WTRU 910 in subframe number n, thus expecting an ACK/NACK response 920 on UL access in subframe number n+4. An UL collision between the access and the backhaul links may occur on a condition that the RN 940 was scheduled to transmit a CSR 930 to the eNB 950 in subframe number n+4. This collision may occur regardless of the subframe index number n assuming number n was a DL access subframe.

Referring to FIG. 9B, the RN 940 may transmit an ACK/NACK 955 in subframe n+4 in response to the eNB 950 transmitting data 960 at subframe n. In this scenario, a collision may occur in subframe n+4 if the WTRU 910 was prescheduled to transmit a CSR 965 in subframe n+4.

Figure 10:
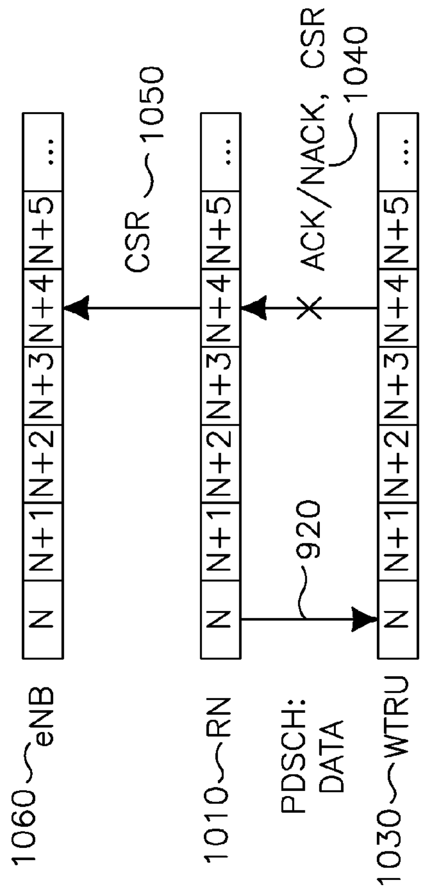
FIG. 10 is a diagram of a collision scenario where UL access ACK/NACK and the CSR may collide with the UL backhaul CSR.

FIG. 10 is a diagram of a collision scenario where UL access ACK/NACK and the CSR may collide with the UL backhaul CSR. This collision scenario is similar to the scenario in FIG. 9A. Referring to FIG. 10, the RN 1010 may transmit PDSCH data 1020 to the R-WTRU 1030 in subframe number n, thus expecting an ACK/NACK response 1040 on UL access in subframe number n+4. The ACK/NACK response 1040 may be an ACK/NACK or a CSR. An UL collision between the access and the backhaul links may occur on a condition that the RN 1010 was scheduled to transmit a CSR 1050 to the eNB 1060 in subframe number n+4. This collision may occur regardless of the subframe index number n assuming number n was a DL access subframe.

Figure 11:
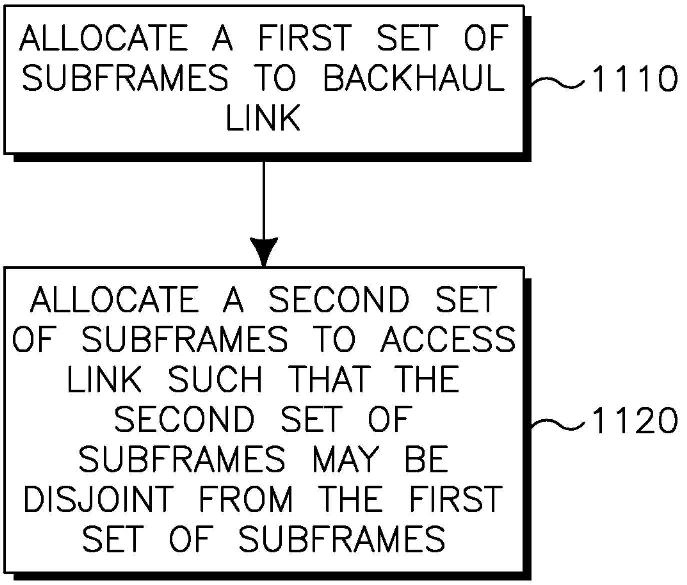
FIG. 11 is a diagram of an example method to avoid collisions between UL access transmissions and backhaul transmissions.

FIG. 11 is a diagram of an example method to avoid collisions between UL access transmissions and backhaul transmissions. As shown in FIG. 11, a first set of subframes may be allocated to the backhaul link 1110. A second set of subframes may be allocated to the access link 1120 such that the second set of subframes may be disjoint from the first set of subframes. For example, modifying a HARQ operation from a periodicity of 8 subframes to a periodicity of 10 subframes, may be used in conjunction with defining non-overlapping sets of subframes for the access and backhaul links.

Figure 12:
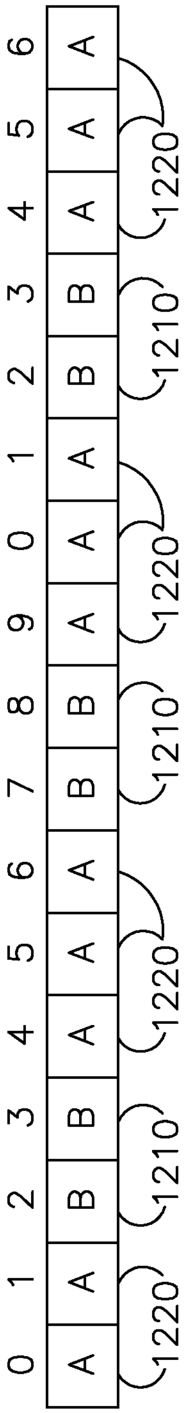
FIG. 12 is a diagram of an example transmission allocation using disjoint sets of subframes for the backhaul and access links.

FIG. 12 is a diagram of an example transmission allocation using disjoint sets of subframes for the backhaul and access links. Referring to FIG. 12, the backhaul link subframe set 1210 may be allocated to subframes 2, 3, 7 and 8 and the access link subframe set 1220 may be allocated to subframes 0, 1, 4, 5, 6 and 9. This type of allocation may be used in conjunction with an aggressive channel coding and channel modulation scheme on the backhaul link for higher spectral efficiency.

This example allocation may result in a periodic pattern with a period of five subframes, where three access subframes may be followed by two backhaul subframes. If the ACK/NACK latency is modified from 4 ms to 5 ms, then the ACK/NACK for data sent in the access subframes may be transmitted in an access subframe. The same may apply for ACK/NACK signaling on the backhaul. Separating the backhaul subframes from the access subframes and modifying the ACK/NACK timing and the UL grant timing from 4 ms to 5 ms may avoid collisions between the access and the backhaul links, either in DL or in UL.

Note that the partitioning may be approximately 60% for the access link and approximately 40% for the backhaul link. This example partitioning may require a more aggressive modulation and coding schemes (MCS) for the backhaul link, compared to the access link. This may be a reasonable assumption, since fixed RNs may have a better quality backhaul link than the access link.

Figure 13:
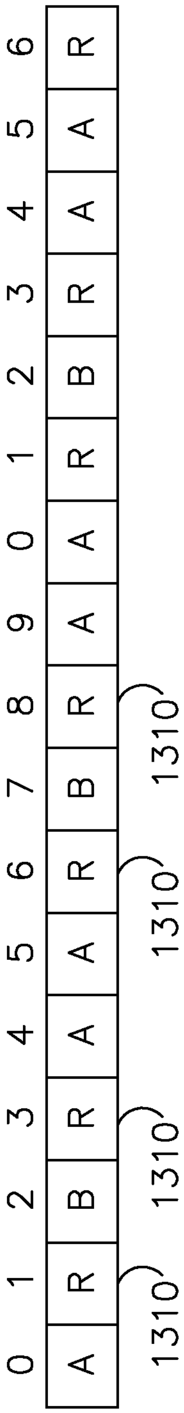
FIG. 13 is a diagram of a configurable allocation that may be configured to support different bandwidth requirements for the backhaul and access links.

The allocation scheme may be configured to support different bandwidth requirements for the backhaul and access links. An example is shown in FIG. 13, where subframes 1, 3, 6 and 8 may be used for regular traffic 1310, for example, the traffic from the eNB that may be communicated directly to the WTRUs. In this example, sub-frames 0, 4, 5, and 9 may be allocated to the access link, and sub-frames 2 and 7 may be allocated to the backhaul link. This may result in the subframe pattern "ARBRA", which is periodic with a period of 5 sub-frames, and has the following properties: for each access link sub-frame "A" there may be an access link sub-frame "A" 5 sub-frames later, for each backhaul sub-frame "B" there may be a backhaul sub-frame "B" 5 sub-frames later, and for each regular sub-frame "R" there may be a regular sub-frame "R" 5 sub-frames later. In an alternative (not shown), sub-frames 3 and 8 may be configured for access link, in addition to the mandatory sub-frames 0, 4, 5 and 9, while the backhaul link may use sub-frames 2 and 7, and the regular traffic may use sub-frames 1 and 6. This may result in the pattern "ARBAA" which has the same properties as explained before. In yet another alternative, (not shown), sub-frames 2 and 7 may be configured for access link, in addition to sub-frames 0, 4, 5 and 9 already used for access. The backhaul link may use sub-frames 3 and 8, while the regular traffic may use sub-frames 1 and 6. This may result in the pattern "ARABA" which has the same periodicity properties as explained above, for example a periodicity of 5 sub-frames, and each of the access ("A"), backhaul ("B") and regular ("R") sub-frames has a periodicity of 5 sub-frames, respectively). By maintaining a periodicity of the allocation pattern equal to the ACK/NACK response time, flexible sub-frame configurations may be generated to match the bandwidth needs for the access, backhaul and regular links, while ensuring collision avoidance. This method may be used to avoid collisions between UL access and backhaul transmissions in LTE-A WTRUs, however since the ACK/NACK response time may be 5 ms, this method may not be backward compatible for use in LTE WTRUs. This method may be used to address backhaul/selective relaying issues.

In another example, UL Synchronous HARQ operation may be configured to use an automatic ACK coupled with an adaptive HARQ retransmission such that the redundancy value (RV) may be set to a value that may be the same as for the initial transmission. The automatic ACK option may be used when the UL feedback falls into MBSFN subframe time window.

Figure 14:
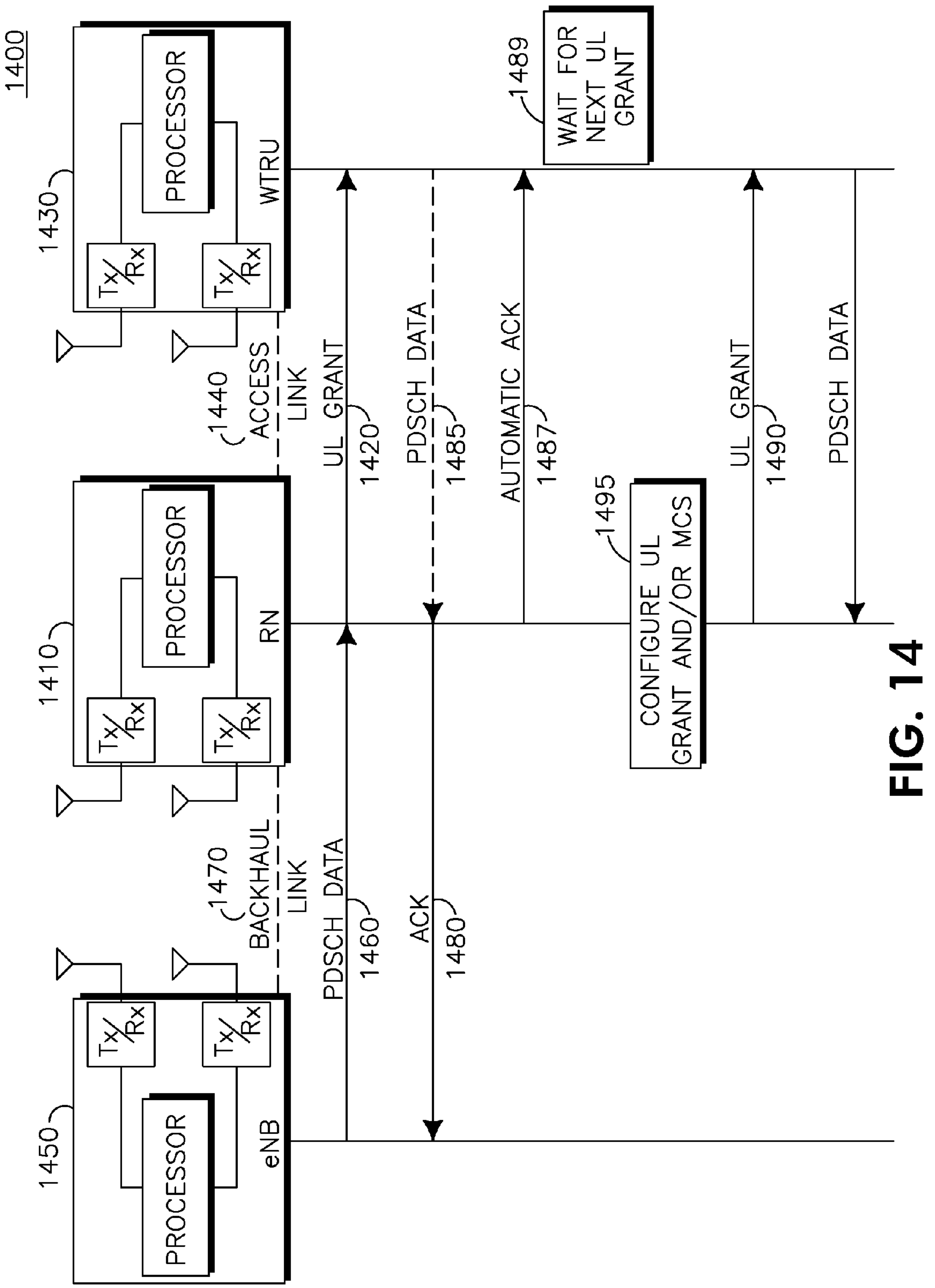
FIG. 14 is a diagram of an example automatic ACK procedure.

FIG. 14 is a diagram of an example automatic ACK procedure 1400. Referring to FIG. 14, the RN 1410 may send an UL grant 1420 to the WTRU 1430, during an MBSFN subframe n, on the access link 1440 in the PDCCH part of the subframe, while the eNB 1450 may send PDSCH data to the RN 1410 on the backhaul link 1470, in the PDSCH part of the subframe. As a result, the RN 1410 may send UL ACK/NACK feedback 1480 on the backhaul link in subframe n+4, thus missing the reception of the UL access link PDSCH data 1485 from the WTRU 1430. In this example, the RN 1410 may be configured to send an automatic ACK 1487 to the WTRU to positively acknowledge reception of the PDSCH data 1485. As a result, the WTRU 1430 may not flush its internal buffer, and may not automatically perform a retransmission. Instead, the WTRU 1430 may wait for the next UL grant 1489.

A next UL grant 1490 may be signaled in the PDCCH from RN 1410 using DCI format 0. The RN 1410 may configure an NDI bit and transmit the UL grant for a retransmission, and may also configure the MCS as based on a channel condition 1495, thus performing an adaptive retransmission. The RN may be in control of the UL grant schedule and perform an adaptive retransmission. An adaptive retransmission may be performed while maintaining the same timing for both the PHICH and the PDCCH channels. The automatic ACK approach may provide flexibility in scheduling the retransmission of the transport block missed by the RN in subframe n+4, and may allow an opportunity to perform adaptive retransmission, for example, by using a different MCS as compared to the initial transmission. It should be noted that upon scheduling the retransmission, the RN may set the redundancy value (RV) to 0, such as for a new transmission, in PDCCH format 0, in order to prioritize the systematic bits over the parity bits of the code word The automatic ACK followed by the adaptive HARQ retransmission approach may be used, for example, to avoid collisions between UL access data and UL backhaul data in subframe n+4. In addition, for scenarios where a transmission timing interval (TTI) bundling may be configured, the RN may receive the data at the next TTI in which case, the RN may not request a retransmission.

Figure 15:
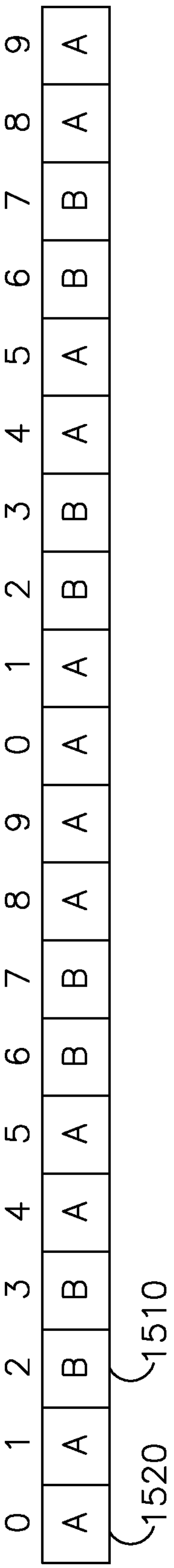
FIG. 15 is a diagram of an example allocation for hybrid automatic repeat request (HARQ) operation using a periodicity of 8 subframes.

FIG. 15 is a diagram of an example allocation for HARQ operation using a periodicity of 8 subframes. This example may be backward compatible. In this example, the backhaul link subframe set 1510 may be allocated to subframes 2, 3, 6, and 7. The access link subframe set 1520 may be allocated to subframes 0, 1, 4, 5, 8 and 9. In this example, subframe 8 and 9 may be barred for initial WTRU UL grant by the RN.

Note that by not sending UL grants to the WTRU in subframes 8 and 9, the backward compatibility with the LTE WTRUs may be maintained. For example, UL grants sent to the WTRU in subframes 0 and 1 may trigger a UL PUSCH transmission on the access link in the access subframes 4 and 5, respectively. In this example, a collision with the backhaul may not occur since the backhaul is allocated in a different subframe. Similarly, UL grants sent to the WTRU in subframes 4 and 5 may trigger UL PUSCH transmission on the access link in the access subframes 8 and 9, respectively.

Figure 16:
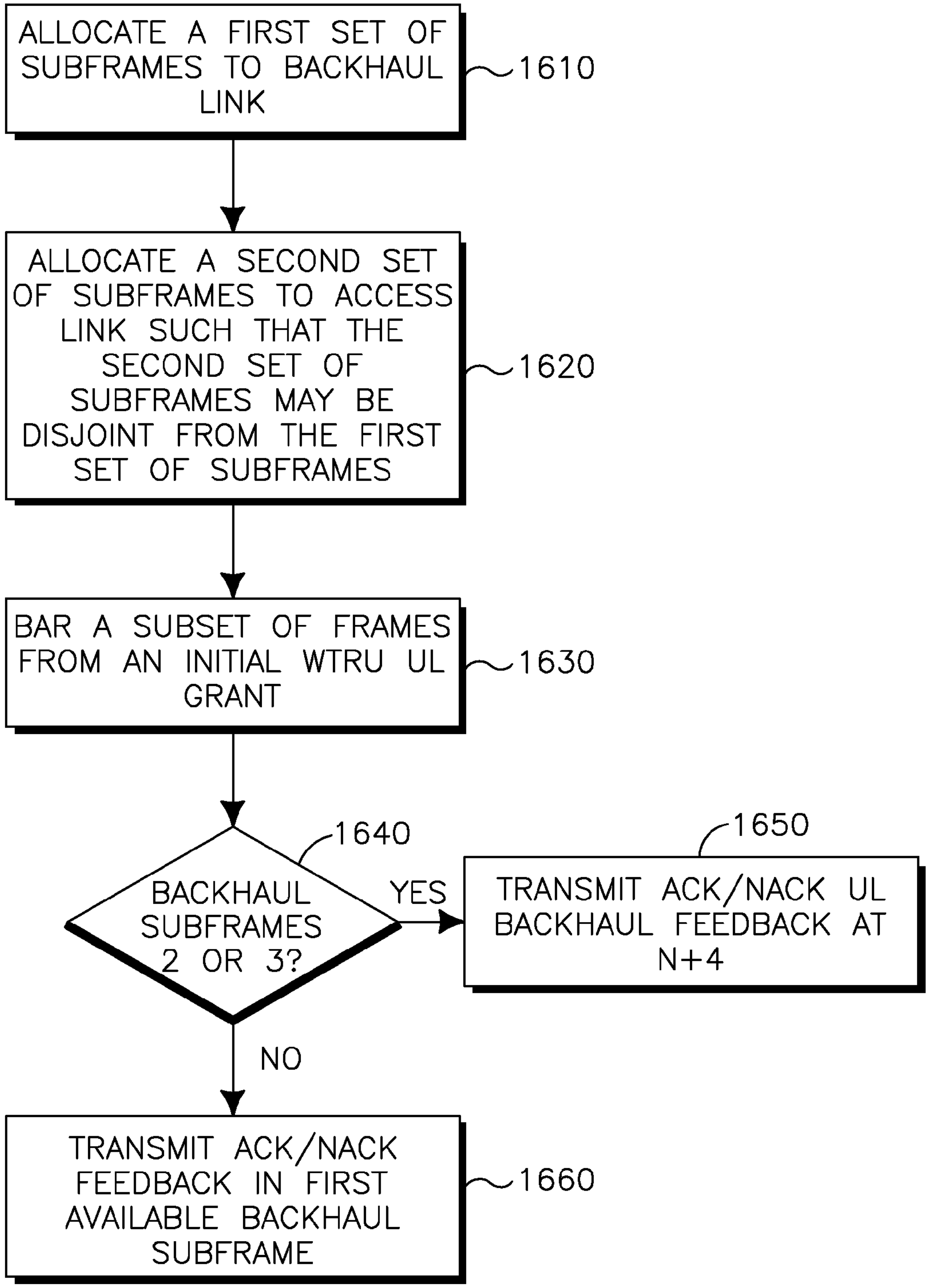
FIG. 16 is a diagram of an example HARQ process on the backhaul link using both DL HARQ and UL HARQ.

FIG. 16 is a diagram of an example HARQ process on the backhaul link using both DL HARQ and UL HARQ. Referring to FIG. 16, an RN may allocate a first set of subframes to a backhaul link 1610. A second set of subframes may be allocated to an access link such that the second set of subframes is disjoint from the first set of subframes 1620. In this example, a third set of subframes may be barred from an initial WTRU UL grant 1630. If, in step 1640, subframe 2 or 3 is allocated for a backhaul link, the RN may transmit an ACK/NACK UL feedback at subframe n+4 1650. If, in step 1640, subframe 2 or 3 is not allocated for an access link, the RN may transmit an ACK/NACK feedback in a first available backhaul subframe 1660.

An R-PDCCH subframe timing offset may be used to support early control channel reception in a backhaul link. The R-PDCCH may be used to assign a DL resource in the subframe and/or in one or more later subframe and to assign UL resources in one or more later subframes. If the R-PDCCH is configured such that the scheduling information for the RN is signaled to the RN in advance, then the RN may schedule the DL and/or UL access link to avoid any potential collision between the backhaul link and access link. The R-PDCCH configuration may be dynamic or semi-static. This method may allow for a coordinated resource allocation framework where the RN may perform resource allocation decisions on the access link based on a decision the eNB may have made.

As mentioned above, the DL backhaul may use gaps in the RN to WTRU transmission using MBSFN subframes. In LTE, the UL grant received in subframe number n may be valid for data transmission in subframe number n+4. Moreover, due to the synchronous nature of the uplink HARQ operation, the WTRU may retransmit the uplink data in subframe number n+8 on a condition that no ACK is received in subframe number n+4. To avoid unnecessary data retransmission from the WTRU or unnecessary out-of-synch declaration by the WTRU, the eNB may acknowledge reception of UL data. However, because of the gap in backhaul subframe definitions, the eNB may not be able to acknowledge reception of UL data.

The following examples assume that the DL backhaul may be achieved by creating gaps in the RN DL transmission through MBSFN subframes in the relay cell. This mechanism may be used to avoid access/backhaul collisions in the DL. Thus, only the UL collisions may be considered. Three main types of solutions may be identified to address UL collisions, including interface (Un or Uu) prioritization when an UL collision occurs, advance signaling to the RN of the UL backhaul subframes, and pre-definition of subframe configurations for access/backhaul subframe partitioning to minimize collisions.

One basis for an interface prioritization solution may be that each type of UL collision carries a different cost. Depending on the cost of the collision, it may be beneficial to prioritize the access link (Uu interface) over the backhaul link (Un interface). In other scenarios, prioritizing Un over Uu may be more desirable. Typical solutions may assume, by default, that the backhaul link (Un) is prioritized over the access link (Uu). For example, one solution may prioritize the access link over the backhaul for DL collisions, but it may not provide a similar solution for UL collisions. It would therefore be desirable to have a method and apparatus to determine the relative priority of Uu versus Un upon detecting UL collision scenarios that prioritize Uu or Un accordingly.

To facilitate a determination of the relative priority of the interfaces, the cost of each UL collision may be evaluated. The collisions where the Uu UL data is lost due to the RN transmitting in UL on Un are costly, because they may result in increased power consumption at the R-WTRU, increased interference created by the R-WTRU UL data transmission, and wasted bandwidth on the Uu.

Figure 17:
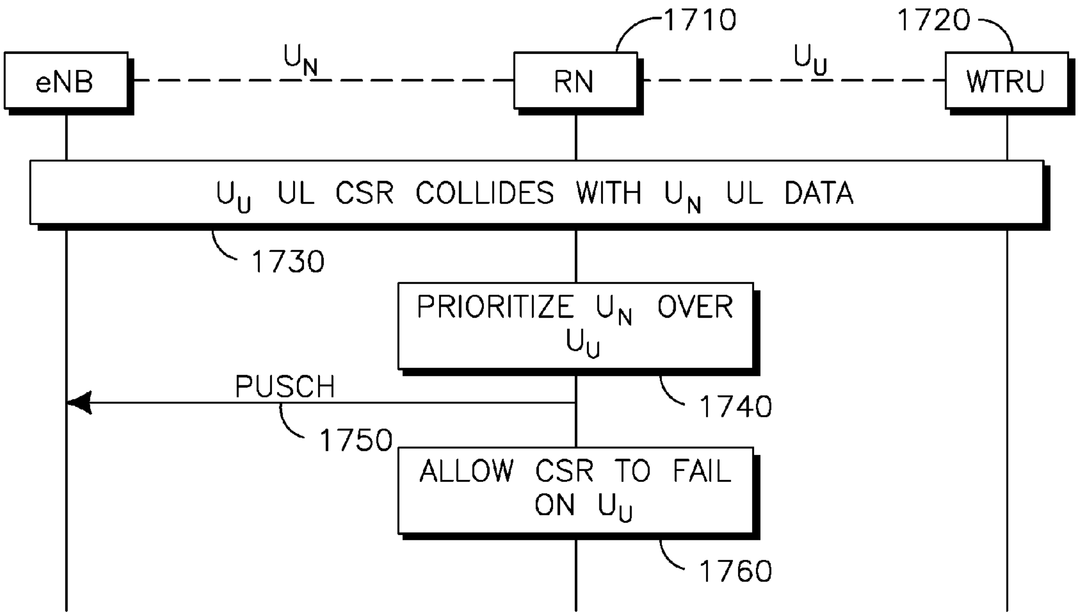
FIG. 17 is a diagram of an example method for determining interface priority.

In the following examples, the priority may be determined at the end of subframe n. If priority is given to the Uu interface, transmission may not occur on the Un interface in subframe n+4, thus a collision may be avoided. If priority is given to the Un interface, the collision may occur in subframe n+4. FIG. 17 is a diagram of an example method for determining interface priority where a Uu UL CSR may collide with Un UL data. This type of collision may result in the RN 1710 missing Uu UL CSR from the R-WTRU 1720, and may not be very costly. This type of collision may result in a gradual performance degradation, as opposed to catastrophic failure. When the Uu UL CSR collides with Un UL data 1730, the RN may prioritize Un over Uu 1740 by transmitting the PUSCH 1750 on the Un and allowing the CSR on the Uu to fail 1760.

Figure 18:
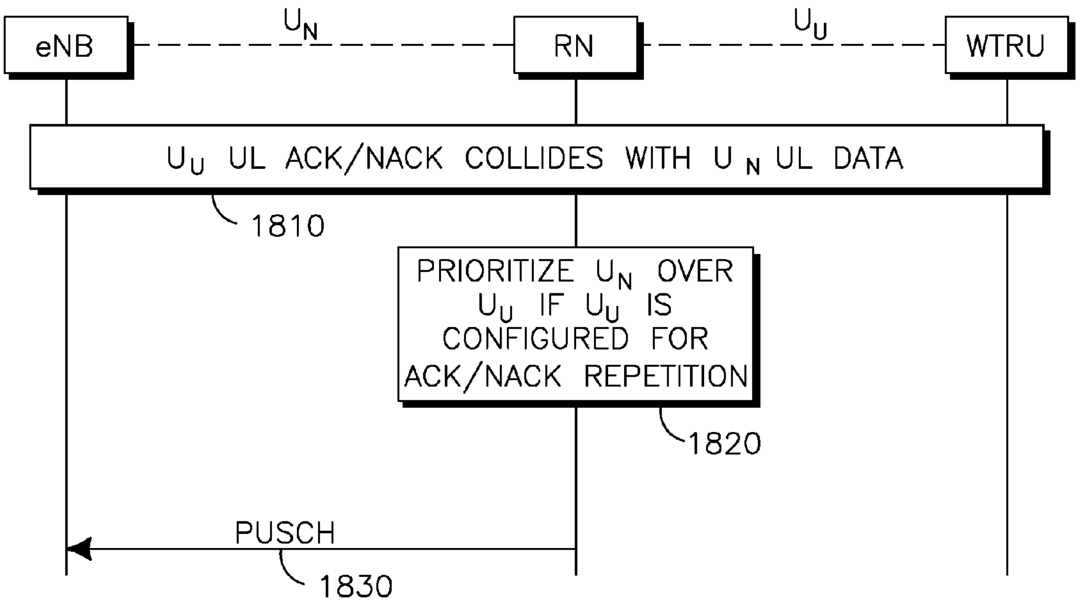
FIG. 18 is a diagram of another example method for determining interface priority.

FIG. 18 is a diagram of an example method for determining interface priority where a Uu UL ACK/NACK may collide with Un UL data. This type of collision may occur where the Uu interface may be configured for ACK/NACK repetition. When a Uu UL ACK/NACK collides with Un UL data 1810, the RN may prioritize Un over Uu 1820 and transmit the Un UL data 1830 to the eNB.

Figure 19:
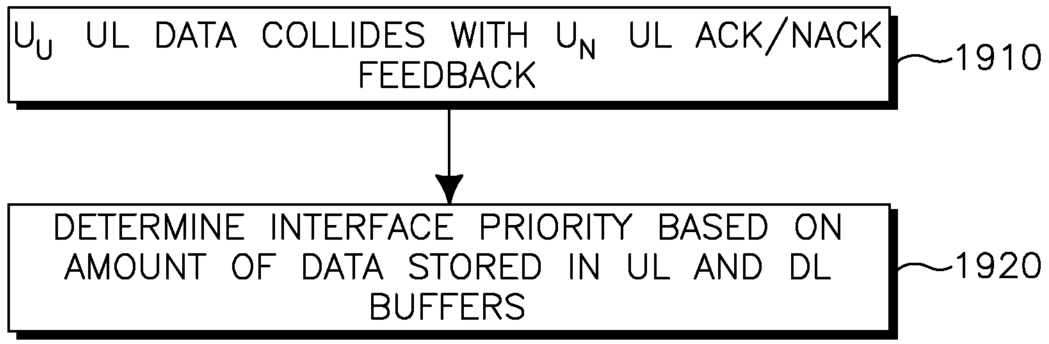
FIG. 19 is a diagram of another example method for determining interface priority.

FIG. 19 is a diagram of an example method for determining interface priority where Uu UL data may collide with the Un UL ACK/NACK feedback. When the Uu UL data collides with the Un UL ACK/NACK feedback transmission 1910, the trade-off may be between an access link UL retransmision of data by the R-WTRU on a condition that the Un interface is prioritized, versus a backhaul DL retransmision of data by the eNB for the RN on a condition that the Uu interface is prioritized. In one alternative, the relative priority of Uu versus Un may be determined based on the amount of data stored in the UL and the DL buffers at the RN 1920. For example, the RN may prioritize the Uu over Un on a condition that the RN UL buffers do not have enough data to support UL grants over the Un, the RN may prioritize the Un over Uu on a condition that the RN DL buffers do not have enough data to support DL grants over the Uu, or on a condition that both the above conditions are true, the RN may determine the relative priority based on other QoS metrics such as latency.

Figure 20:
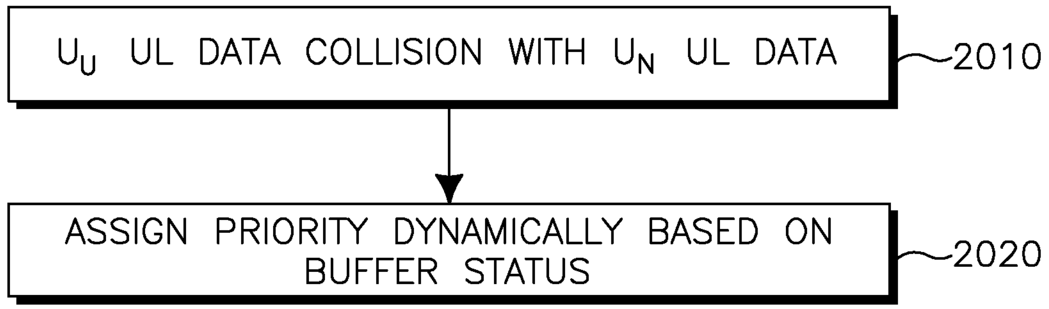
FIG. 20 is a diagram of another example method for determining interface priority.

FIG. 20 is a diagram of an example method for determining interface priority where Uu UL data may collide with Un UL data. When Uu UL data collides with Un UL data 2010, priority may be dynamically assigned to either Uu, or Un, depending on the buffer status at the RN 2020. More specifically, when the size of the UL data buffered at the RN buffer is large, indicating that the Un interface may be congested, priority may be assigned to the Un UL data transmission. Conversely, on a condition that the RN buffers do not have much data, priority may be assigned to the Uu UL data. The mechanism of dynamically changing the relative priority of the Un and Uu based on collisions between Un UL data and Uu UL data may provide a form of flow control at the RN.

The methods described above may be used to specify the relative priority of the interfaces for the collision scenarios described above, and the outcome is shown in Table 2.

TABLE 2

Interface Priority for UL Collision Scenarios

| Scenario Number | Description | Priority | Note |
|---|---|---|---|
| 1 | Uu UL data collides with Un UL A/N | Uu over Un on a condition that UL RN buffer empty<br>Un over Uu on a condition that RN DL buffer empty | RN may receive the Uu UL data from R-WTRU<br>RN may not transmit A/N on Un UL |
| 2 | Uu UL data collides with Un UL data | Uu over Un on a condition that UL RN buffer empty<br>Un over Uu on a condition that UL RN buffer is full (Un interface congested) | RN may receive the Uu UL data from R-WTRUs<br>RN may not transmit Un UL data<br>RN may transmit Un UL data<br>RN may not receive Uu UL data from R-WTRUs |

TABLE 2-continued

Interface Priority for UL Collision Scenarios

| Scenario Number | Description | Priority | Note |
|---|---|---|---|
| 3 | Uu UL A/N (repetition) collides with Un UL data | Un over Uu | RN may transmit Un UL data<br>RN may not receive Uu UL A/N |
| 4 | Uu UL data retransmission collides with Un UL data | Uu over Un on a condition that UL RN buffer empty<br>Un over Uu on a condition that UL RN buffer full | RN may receive the Uu UL data from R-WTRUs<br>RN may not transmit Un UL data<br>RN may transmit Un UL data<br>RN may not receive Uu UL data from R-WTRUs |
| 5 | Uu UL data collides with Un UL CSR | Uu over Un | RN may receive Uu UL data from R-WTRU<br>RN may not transmit Un UL CSR |
| 6 | Uu UL CSR collides with Un UL data | Un over Uu | RN may transmit data on Un UL backhaul<br>RN receiver may be powered off or ignores the CSR from R-WTRUs |
| 7 | Uu UL A/N collides with Un UL CSR | Uu over Un | RN may receive the Uu UL A/N from R-WTRU<br>RN may not transmit Un UL CSR |
| 8 | Uu UL CSR collides with Un UL A/N | Un over Uu | RN may transmit Un UL A/N<br>RN may not receive Uu UL CSR from R-WTRU |
| 9 | Uu UL A/N and CSR collides with Un UL CSR | Uu over Un | RN may receive the Uu UL A/N and CSR from R-WTRU<br>RN may not transmit Un UL CSR |

In one example, the UL or DL buffers on either Un or Uu interface may be maintained directly or indirectly per logical channel based on QoS. The prioritization of Un interface data versus Uu interface data may be performed with the following objective functions that may contribute to the overall spectrum efficiency. One objective function may be that the relative ratios between the sizes of the DL buffers content versus UL buffers content may not negatively impact the ability to simultaneously achieve the spectrum efficiency goals. One example of this may be 5 bps/Hz in DL versus 3.75 bits/MHz in UL. Another objective function may be that the waiting time in the transmission queues of the newly queued data is minimized. For example, data may not be waiting in a queue while there may be an opportunity to transmit data from another queue. This may be based on a condition that the latter may be empty if it does not have enough data to warrant a transmission grant. A third objective function may be general QoS requirements identified by the QoS Class Identifier (QCI) representing the following QoS parameters: Guaranteed Bit Rate (GBR) versus non-GBR, Maximum Bit Rate (MBR), Aggregate Maximum Bit Rate (AMBR), Layer 2 (L2) Packet Delay Budget (L2PDB), L2 Packet Loss Rate (L2PLR) and Allocation Retention Priority (ARP), for example.

In this example, based on the objective functions listed above, data over Un versus data Uu may be prioritized as follows. $\rho$ may be denoted as the ratio of DL spectrum efficiency to the UL spectrum efficiency. Assuming 5 bps/Hz in DL versus 3.75 bits/MHz in UL for LTE, the ratio $\rho$ may be 1.33. $\beta$ may be denoted as the ratio of DL bandwidth to the UL bandwidth available for data transmission after deduction of the bandwidth required for physical layer signaling. The ratios between the aggregate sizes of the content of DL Un interface buffers (buffer occupancies) for a given QoS level, versus the aggregate UL Uu interface buffers for the same QoS level, may be the product of $\rho$ and $\beta$, i.e. $\rho*\beta$. For data with a different transmission priority level (QOS/latency), the buffer with the least anticipated waiting time for the newly added data may determines the interface priority.

Figure 21:
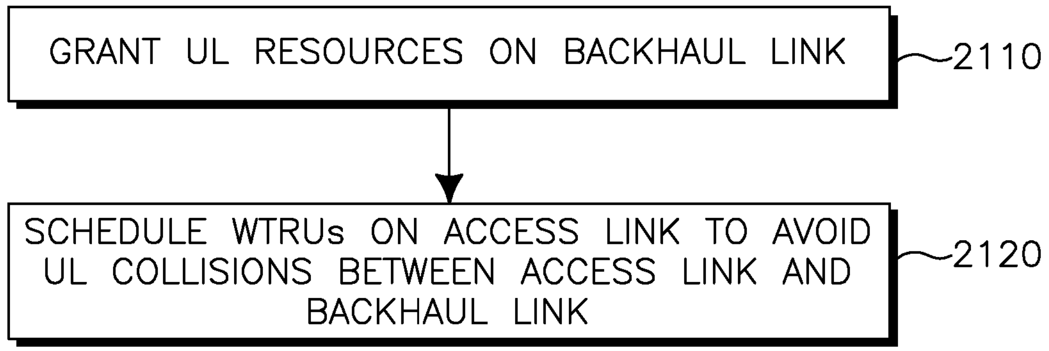
FIG. 21 is a diagram of an example method for avoiding collisions using advance signaling of the UL backhaul subframes to the relay node (RN)

FIG. 21 is a diagram of an example method for avoiding collisions using advance signaling of the UL backhaul subframes to the RN. Referring to FIG. 21, the RN may grant UL resources on a backhaul link 2110. The RN may then schedule WTRUs on an access link to avoid UL collisions between the access link and the backhaul link 2120. For example, an R-PDCCH may provide a DL assignment or UL grant in a later subframe such that R-PDCCH to R-PDSCH may be $\delta D$ subframes ($\delta D>1$), and R-PDCCH to PUSCH may be $\delta U>4$. On a condition that the R-PDCCH grants uplink resources on the backhaul link in one or more later subframes, the RN may know in advance which subframes may be used for UL data backhaul. This may allow the RN to schedule the R-WTRUs on the access link such that UL collisions between the access link and the backhaul UL data may be avoided or minimized by scheduling UL and DL transmissions on the access link that do not result in UL collisions. Examples of collisions that may be avoided with this mechanism include scenarios 2, 4, and 5 in Table 2.

On a condition that the R-PDCCH assigns downlink resources on the backhaul link in one or more later subframes, the RN may know in advance what subframes may be needed for UL transmission of the ACK/NACK feedback on the backhaul. Similarly, on a condition that the R-PDCCH grants uplink resources on the backhaul link in subframe greater then n+4, the RN may know the backhaul requirement in advance and may avoid scheduling conflicts on the access link. The RN may then schedule the R-WTRUs such that collisions between the UL access link and the UL ACK/NACK backhaul may be avoided or minimized. Examples of collisions that may be avoided in this case are 1 and 8 in Table 2.

The delay between the R-PDCCH and the DL assignment/UL grant may allow the RN to know both DL and UL assignments on the backhaul link in advance, and may therefore schedule the WTRUs associated with the RN to avoid or minimize the UL collisions. As a result of the delay δD between the R-PDCCH and the DL resource assignment for R-PDSCH or additional delay for UL grant, the timing of the DL & UL HARQ process on the backhaul interface may be modified, as described below. This example method may be used to avoid collisions in scenario 5 in Table 2, by not sending an UL grant to the WTRU associated with the RN in subframe n. The example collision in scenario 7 in Table 2 may be avoided by setting a delay between the R-PDCCH carrying the DL assignment and the corresponding DL data such that the Uu UL ACK/NACK may be sent in a different subframe than the Un UL CSR.

Figure 22:
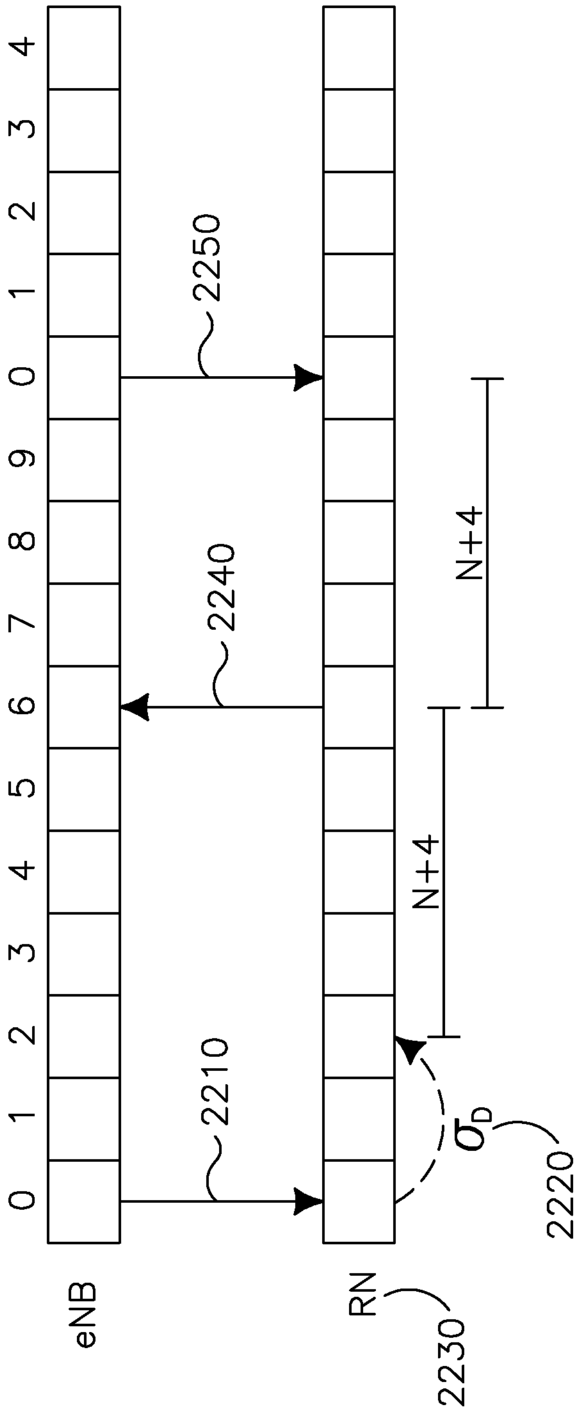
FIG. 22 is a diagram of an example method for avoiding collisions where the RTT and the number of HARQ processes may increase.

FIG. 22 is a diagram of an example method for avoiding collisions where the round trip time (RTT) and the number of HARQ processes may increase. The example shown in FIG. 22 is based on δD=2. As shown in FIG. 22, the DL assignment 2210 may have an associated delay δD 2220. If δD 2120 has a value of 2, the RN 2230 may transmit an ACK/NACK 2240 at subframe 6. On a condition that a δD subframe delayed DL assignment and/or additionally δD+4 delayed UL grant 2250 is applied, the HARQ RTT may be increased to δD+8. Additionally, the number of HARQ processes may be increased to NHARQ=δD+8. In the DL case, assuming that data for HARQ process number n may be transmitted in subframe number n, the corresponding control may be signaled in subframe number n−δD. The UL ACK/NACK for process number n may be transmitted in subframe number n+4 such that the corresponding transmission of the DL control information for that HARQ process may occur in subframe number n+8. Thus, the period between two consecutive transmissions of the control R-PDCCH for HARQ process number n may be: (n+8)−(n−δD)=8+δD. Therefore, the RTT and the number of HARQ processes may increase from a value of 8 to 8+δD.

The delay δD 2220 may be chosen as a trade-off between the constraints discussed below. The number of HARQ processes may be kept low such that the amount of soft memory required at the receiver may be minimized and the number of bits to signal the HARQ process number may not increase significantly. One alternative to limit the signaling bits may be to limit the number of HARQ processes to 16, which may result in an increase from 3 to 4 bits to represent the HARQ process number. This may set an upper bound for the delay δD of 8 ms or subframes.

A larger value of δD may allow the RN to benefit from the advance notice to properly schedule the R-WTRUs on the access link. The total delay for the loop adaptation process may not be a design issue for fixed RNs, where the channel may be slowly changing in time. For example, assuming a Doppler frequency of 5 Hz for the non-line of sight (NLOS) component of the backhaul channel, the coherence time of the channel may be 200 ms. For some values of the R-PDCCH to R-PDSCH delay δD, the total loop delay of δD+8 may be significantly smaller than the coherence time of the channel, thus performance degradation of the link adaptation process may not occur. For the case of mobile RNs, it may be desirable to keep the delay δD relatively small such that the R-PDSCH data transmission may not use a stale modulation and control scheme (MCS). In that case, one solution may be to increase the frequency of CQI/RI/PMI as well as the sounding reference signal (SRS) to make proper scheduling decisions.

The previous description explained the impact of the R-PDCCH to R-PDSCH delay δD on the DL HARQ. A similar explanation may apply the impact of a delay between the R-PDCCH and the UL grant R-PUSCH on the timing of the backhaul UL HARQ process. Increasing the number of HARQ processes, and consequently the RTT, may be performed to support all transmission opportunities. However, increasing the number of HARQ processes may not be needed on a condition that only the DL transmission opportunities corresponding to the MBSFN subframe allocation are considered.

Figure 23:
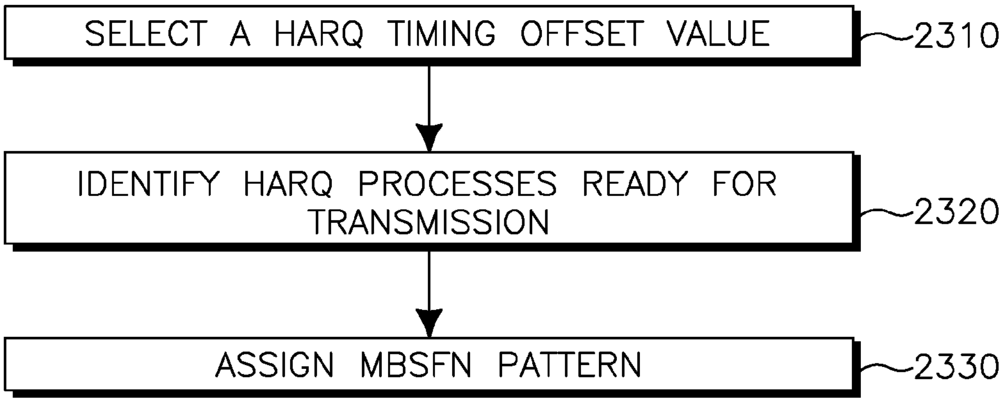
FIG. 23 is a diagram of an example method for avoiding collisions.

FIG. 23 is a diagram of an example method for avoiding collisions. Referring to FIG. 23, the eNB may select a HARQ timing offset value 2310. The eNB may then identify HARQ processes that are ready for transmission 2320, and assign a MBSFN sub-frame n to the identified HARQ processes 2330.

Figure 24:
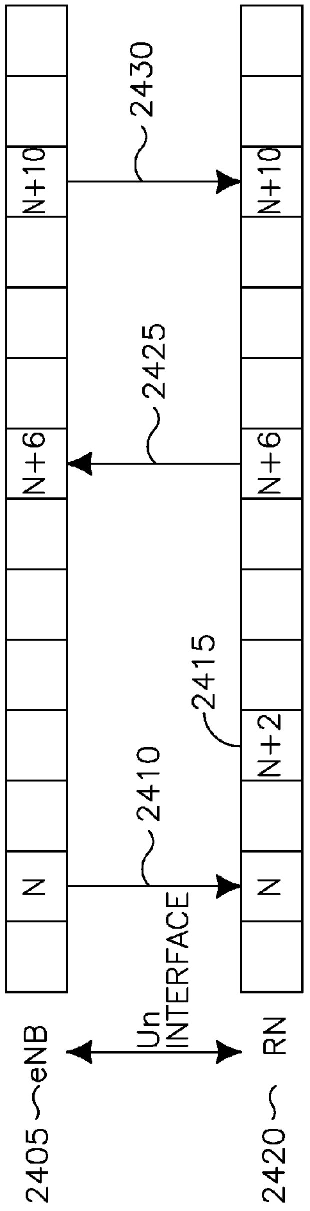
FIG. 24 is a diagram of an example method for avoiding collisions using an R-PDCCH that includes a HARQ timing offset.

FIG. 24 is a diagram of an example method for avoiding collisions using an R-PDCCH that includes a HARQ timing offset. An R-PDCCH may be received in subframe number n with a grant for PDSCH that may include a DL HARQ Timing offset relative to subframe number n that indicates the DL HARQ timing starting subframe. The offset may be 0 on a condition that the resource assignment is valid at subframe number n. Similarly, an R-PDCCH may be received in subframe number n with a grant for PUSCH that may include a UL HARQ Timing offset relative to the subframe number n that indicates the UL HARQ timing starting subframe. The offset may be 0 on a condition that the resource assignment is valid at subframe number n+4.

In this approach, LTE subframe periodicity may be kept for HARQ operation on the Un interface. The offset may be equivalent to a timeline translation, shifting the HARQ timeline in the time domain with respect to the subframe number n carrying the UL resource or DL resource allocation information. The timing offset value may also be interpreted as an indication of the time when the allocated grant becomes active for the first time. This technique for defining the timing offset may avoid an increase in data transfer latency over the Un interface with respect to LTE.

The offset value may be blindly selected by the eNB based on the knowledge of DL and UL subframes already communicated, semi-statically, to RN for backhaul communication and prior eNB grant assignments to the RN. The selection of the offset value may be further refined by the eNB, on a condition that the eNB is aware of the schedule decisions made by the RN on the access link such as the CSR and ACK repetition schedule and/or semi-permanent resource allocation.

During each transmission time interval (TTI), the eNB may identify all the HARQ processes ready for transmission, for example the HARQ processes that have been positively acknowledged by their respective peers. The eNB may assign the HARQ processes for DL or UL grant with the appropriate HARQ timing offset. The timing offset may vary from one UL grant assignment to another.

Both the DL HARQ timing offset value and the UL HARQ timing offset value may be same, in which case they may be signaled using the same information element (IE) in the R-PDCCH format. Alternatively, the DL offset value may be different from the uplink offset value, in which case they may be signaled using different IEs.

The advanced signaling approaches described above may be used to avoid or minimize first time transmission collisions. The collisions caused by retransmision may not be avoidable by these approaches. Even on a condition that such methods do avoid collisions caused by retransmision, they may be inefficient in terms of spectrum resource usage.

Referring to FIG. 24, the eNB 2405 may transmit an UL grant 2410 on an R-PDCCH at subframe n. The UL grant 2410 may include a HARQ timing offset. In this example, the HARQ timing offset is 2, therefore the HARQ timing starting point 2415 is subframe n+2. The RN 2420 may then transmit UL backhaul data 2425 on a PUSCH at subframe n+6. In response, the eNB 2405 may transmit an ACK/NACK 2430 on a PHICH at subframe n+10.

Figure 25:
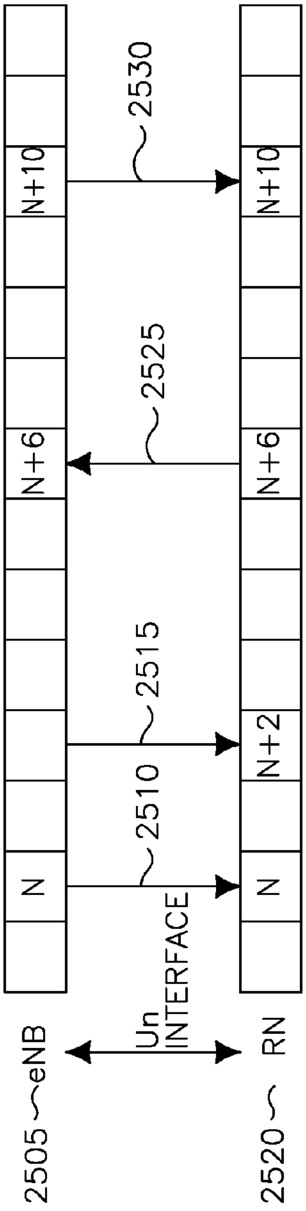
FIG. 25 is a diagram of an example method for avoiding collisions using an R-PDCCH that includes a HARQ timing offset.

FIG. 25 is a diagram of an example method for avoiding collisions using an R-PDCCH that includes a HARQ timing offset. Referring to FIG. 25, the eNB 2505 may transmit a DL grant 2510 on an R-PDCCH at subframe n. The DL grant 2510 may include a HARQ timing offset. In this example, the HARQ timing offset is 2, therefore the eNB 2505 may transmit data 2515 on a PDSCH at subframe n+2. In response, the RN 2520 may transmit an ACK/NACK 2525 at subframe n+6. The eNB 2505 may then retransmit data 2530 at subframe n+10, n+14, and so on.

Depending on the MBSFN subframe assignment patterns, some collisions may be easily predictable. Consequently, the translation of HARQ timing may be performed using implicit rules as opposed to explicitly signaling rules as described above.

In a first example, an MBSFN pattern may be assigned with a period of 10 ms. In this example, the DL subframes k=1, 11, 21, 31, may be labeled as MBSFN subframes, and the subframes in four Radio Frames may be enumerated from 0 to 39. Thus, the eNB may transmit to the RN on DL on subframes k=1, 11, . . . and the RN correspondingly may transmit on the uplink to the eNB on subframes k+4=5, 15, 25, 35. Thus, the UL HARQ processes for a second WTRU that may be blocked are (k+4) mod 8=5, 7, 1, 3. Thus, only the odd UL HARQ processes may be blocked once in every 40 ms, or five transmission opportunities. The even HARQ processes may not experience any blocking. In this case, the eNB to RN link may be available every 10 ms.

In a second example, an MBSFN pattern may be assigned with a period of 5 ms. In this example, subframes k=1, 6, 11, 16, 21, 26, 31, 36 may be labeled as MBSFN subframes, and the subframes in four radio frames may be enumerated from 0 to 39. Correspondingly, the UL HARQ processes for a second WTRU that may be blocked are (k+4) mod 8=5, 2, 7, 4, 1, 6, 3, 0. Thus, each UL HARQ process may be blocked once in every 40 ms, or five transmission opportunities of any UL HARQ process. In this example, the eNB to RN link may be available every 5 ms.

In these examples, the translation of the HARQ timing in time domain may be derived via implicit rules, such as considering the resource grant allocation valid with an offset of 4 subframes. For example, in the UL, the first transmission may be at subframe number n+8 instead of number n+4.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A node for avoiding a collision between an access link transmission and a backhaul link transmission, the node comprising:

a receiver configured to receive, from a second node, a first subframe including one of a downlink (DL) or an uplink (UL) resource grant and a variable offset, wherein the variable offset shifts a schedule for all hybrid automatic repeat request (HARQ) communications in a HARQ timeline for a communication by a number of subframes with respect to the first subframe; and a transmitter configured to transmit, to a wireless transmit/receive unit (WTRU), a DL transmission in a second subframe, wherein the second subframe is based on the variable offset.

2. The node of claim 1, wherein the transmitter is further configured to transmit a UL grant in another subframe, wherein the another subframe is based on the variable offset.

3. The node of claim 2, wherein the transmitter is further configured to transmit an acknowledgement/non-acknowledgement (ACK/NACK) based on a delay of the UL resource grant.

4. The node of claim 3, wherein the transmitter is further configured to increase a number of hybrid automatic repeat request (HARQ) processes based on the delay of the UL resource grant.

5. The node of claim 1, wherein the transmitter is further configured to transmit an acknowledgement/non-acknowledgement (ACK/NACK) based on a delay of the DL resource grant.

6. The node of claim 1, wherein the transmitter is further configured to increase a number of hybrid automatic repeat request (HARQ) processes based on a delay of the DL resource grant.

7. The node of claim 1 further comprising:

a processor configured to perform a scheduling decision based on a channel quality indicator (CQI).

8. The node of claim 1 further comprising:

a processor configured to perform a scheduling decision based on a precoder matrix indicator (PMI).

9. The node of claim 1 further comprising:

a processor configured to perform a scheduling decision based on a rank indicator (RI).

10. A method for use in a node for avoiding a collision between an access link transmission and a backhaul link transmission, the method comprising:

receiving, from a second node, a first subframe including one of a downlink (DL) or an uplink (UL) resource grant and a variable offset, wherein the variable offset shifts a schedule for all hybrid automatic repeat request (HARQ) communications in a HARQ timeline for a communication by a number of subframes with respect to the first subframe; and transmitting, to a wireless transmit/receive unit (WTRU), a DL transmission in a second subframe, wherein the second subframe is based on the variable offset.

11. The method of claim 10 further comprising:

transmitting a UL grant in another subframe, wherein the another subframe is based on the variable offset.

12. The method of claim 11 further comprising:

transmitting an acknowledgement/non-acknowledgement (ACK/NACK) based on a delay of the UL resource grant.

13. The method of claim 12 further comprising:

increasing a number of hybrid automatic repeat request (HARQ) processes based on the delay of the UL resource grant.

14. The method of claim 10 further comprising:

transmitting an acknowledgement/non-acknowledgement (ACK/NACK) based on a delay of the DL resource grant.

15. The method of claim 10 further comprising:

increasing a number of hybrid automatic repeat request (HARQ) processes based on the delay of the DL resource grant.

16. The method of claim 10, wherein a scheduling decision is based on a channel quality indicator (CQI).

17. The method of claim 10, wherein a scheduling decision is based on a precoder matrix indicator (PMI).

18. The method of claim 10, wherein a scheduling decision is based on a rank indicator (RI).

* * * * *